(12) United States Patent
Goddard et al.

(10) Patent No.: US 10,416,383 B2
(45) Date of Patent: Sep. 17, 2019

(54) SPATIAL CONTROL OF THE OPTICAL FOCUSING PROPERTIES OF PHOTONIC NANOJETS

(71) Applicant: The Board of Trustees of the University of Illinois, Urbana, IL (US)

(72) Inventors: Lynford Goddard, Champaign, IL (US); Jinlong Zhu, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 16/033,647

(22) Filed: Jul. 12, 2018

(65) Prior Publication Data

US 2019/0025510 A1 Jan. 24, 2019

Related U.S. Application Data

(60) Provisional application No. 62/534,816, filed on Jul. 20, 2017.

(51) Int. Cl.
*G02B 6/26* (2006.01)
*G02B 6/122* (2006.01)
(Continued)

(52) U.S. Cl.
CPC .......... *G02B 6/1223* (2013.01); *G02B 6/107* (2013.01); *G02B 6/12004* (2013.01);
(Continued)

(58) Field of Classification Search
CPC .............. G02B 6/1223; G02B 6/12004; G02B 27/0955; G02B 6/107
See application file for complete search history.

(56) References Cited

U.S. PATENT DOCUMENTS

| 2013/0038917 A1* | 2/2013 | Watanabe | G02B 6/356 359/225.1 |
| 2014/0254032 A1* | 9/2014 | Chen | G02B 3/00 359/720 |

(Continued)

OTHER PUBLICATIONS

Lu et al., "Laser writing of a subwavelength structure on silicon (100) surfaces with particle-enhanced optical irradiation," JETP Lett., vol. 72, pp. 457-459 (2000).
(Continued)

*Primary Examiner* — Ellen E Kim
(74) *Attorney, Agent, or Firm* — Sunstein Kann Murphy & Timbers LLP

(57) ABSTRACT

Methods and apparatus for concentrating light into a specified focal volume and for collecting light from a specified volume. Incident light is coupled through a plurality of successive transmissive asymmetric microstructure elements. The succession of transmissive asymmetric microstructure elements may be designed by representing an electromagnetic field as a linear combination of eigenmodes of one of the succession of transmissive asymmetric microstructure elements. The asymmetric microstructure elements are represented as a plurality of mesh lattice units and eigenmode solutions to Maxwell's equations are obtained for each mesh lattice unit subject to consistent boundary conditions. S-matrix formalism is employed to calculate a field output and weighting coefficients for the eigenmodes are selected to achieve a specified set of field output characteristics.

15 Claims, 14 Drawing Sheets
(14 of 14 Drawing Sheet(s) Filed in Color)

(51) Int. Cl.
G02B 27/09 (2006.01)
G02B 6/10 (2006.01)
G02B 6/12 (2006.01)
G02B 21/00 (2006.01)

(52) U.S. Cl.
CPC ..... *G02B 21/0032* (2013.01); *G02B 27/0927* (2013.01); *G02B 27/0955* (2013.01); *G02B 27/0966* (2013.01)

(56) References Cited

U.S. PATENT DOCUMENTS

| | | | | |
|---|---|---|---|---|
| 2014/0290311 | A1* | 10/2014 | Jain | G02B 6/02052 65/441 |
| 2014/0330131 | A1* | 11/2014 | Francois | G01N 21/7746 600/478 |
| 2015/0109485 | A1* | 4/2015 | Ozaki | G02B 13/0065 348/240.3 |
| 2018/0073686 | A1* | 3/2018 | Quilici | F21K 9/233 |
| 2018/0120545 | A1* | 5/2018 | Aihara | G06T 7/55 |

OTHER PUBLICATIONS

Chen et al., "Photonic nanojet enhancement of backscattering of light by nanoparticles: a potential novel visible-light ultramicroscopy technique," Opt. Express, vol. 12, pp. 1214-1220 (2004).

Hengyu et al., "Photonic jet with ultralong working distance by hemispheric shell," Opt. Express, vol. 23, pp. 6626-6633 (2015).

Itagi et al., "Optics of photonic nanojets," J. Opt. Soc. Am. A, vol. 22, pp. 2847-2858 (2005).

Chen et al., "Highly efficient optical coupling and transport phenomena in chains of dielectric microspheres," Opt. Lett., vol. 31, pp. 389-391 (2006).

Kapitonov et al., "Observation of nanojet-induced modes with small propagation losses in chains of coupled spherical cavities," Opt. Lett., vol. 32, pp. 409-411 (2007).

Liu, "Ultra-elongated photonic nanojets generated by a graded-index microellipsoid," Prog. Electromagn. Res. Lett., vol. 37, pp. 153-165 (2013).

Minin et al., "Localized photonic jets from flat, three-dimensional dielectric cuboids in the reflection mode," Opt. Lett., vol. 40, pp. 2329-2332 (2015).

Yang et al., "Super-resolution imaging of a dielectric microsphere is governed by the waist of its photonic nanojet," Nano Lett., vol. 16, pp. 4862-4870 (2016).

Wu et al., "Modulation of photonic nanojets generated by microspheres decorated with concentric rings," Opt. Express, vol. 23, pp. 20096-20103 (2015).

Wang et al., "Super-resolution optical microscopy based on scannable cantilever-combined microsphere," Microsc. Res. Tech., vol. 78, pp. 1128-1132 (2015).

Gu et al., "Subsurface nano-imaging with self-assembled spherical cap optical nanoscopy," Opt. Express, vol. 24, pp. 4937-4948 (2016).

Chen et al., "Highly efficient optical coupling and transport phenomena in chains of dielectric microspheres," Opt. Lett., vol. 31, 389-391 (2006).

Allen et al., "Microsphere-chain waveguides: Focusing and transport properties," Appl. Phys. Lett., vol. 105, Feb. 11, 2012 (2014).

Shen et al., "Ultralong photonic nanojet formed by a two-layer dielectric microsphere," Opt. Lett., vol. 39, pp. 4120-4123 (2014).

* cited by examiner

Fig. 4A
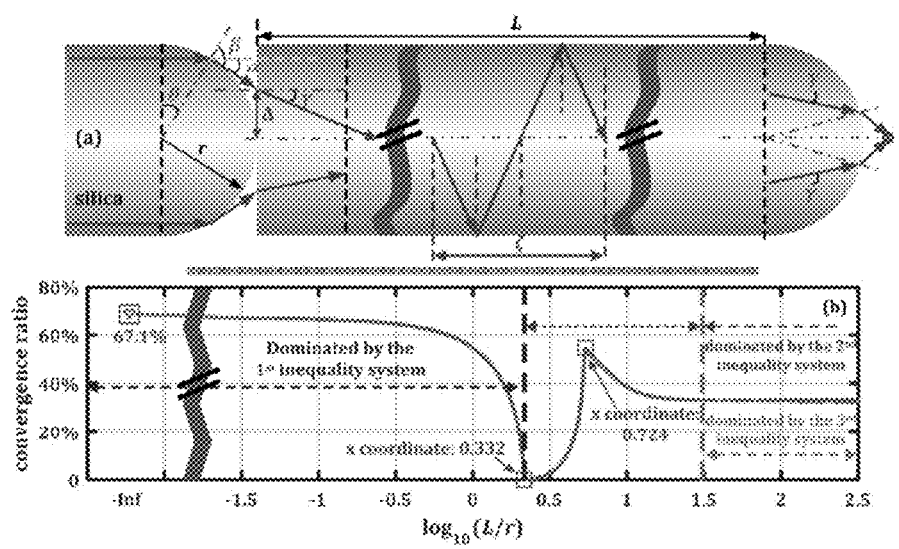
Fig. 4B
Fig. 4C            Fig. 4D
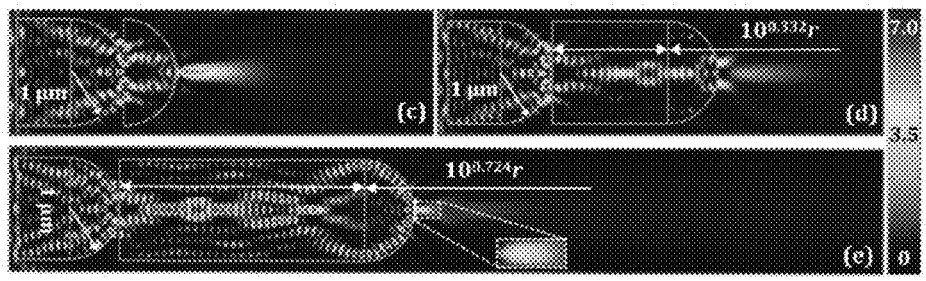
Fig. 4E

Fig. 4F                    Fig. 4G

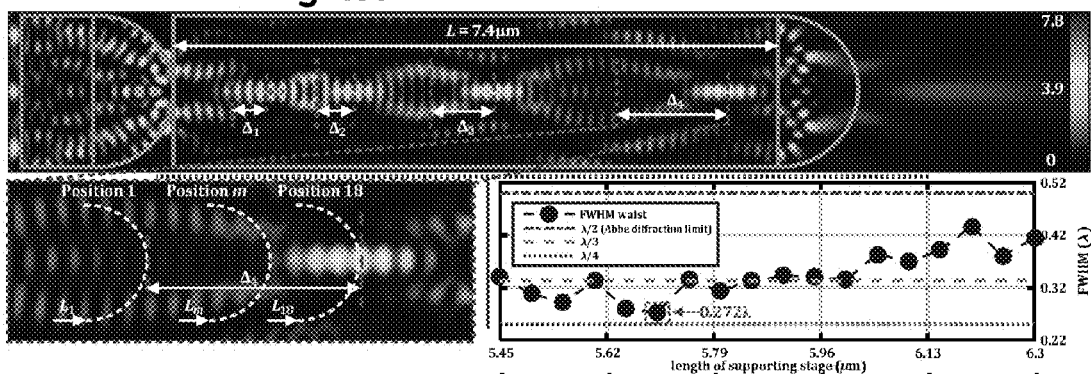
Fig. 7A
Fig. 7B
Fig. 7C
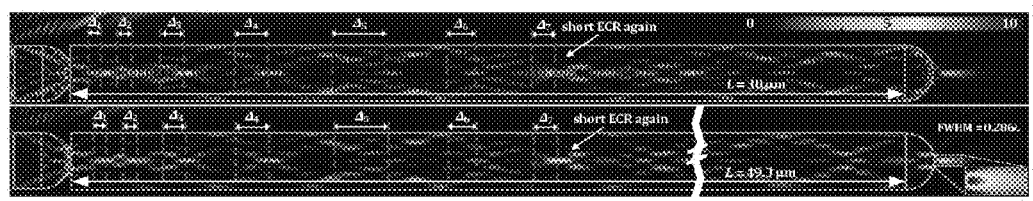
Fig. 8A
Fig. 8B

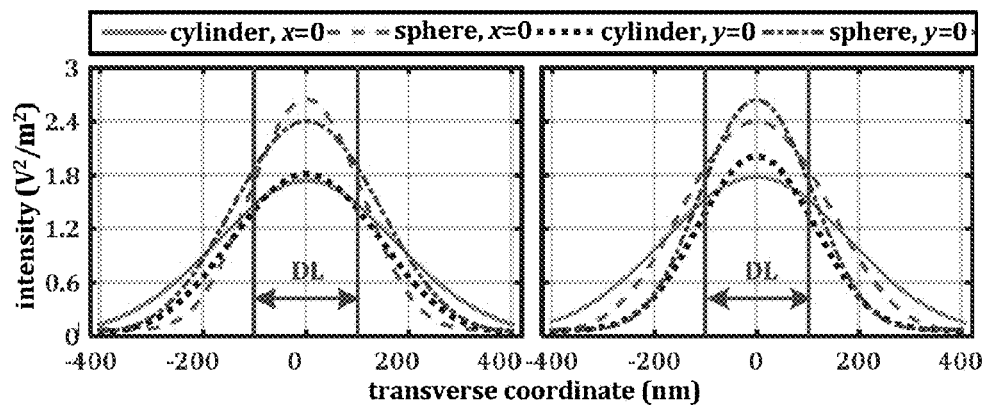
*Fig. 11A*  *Fig. 11B*
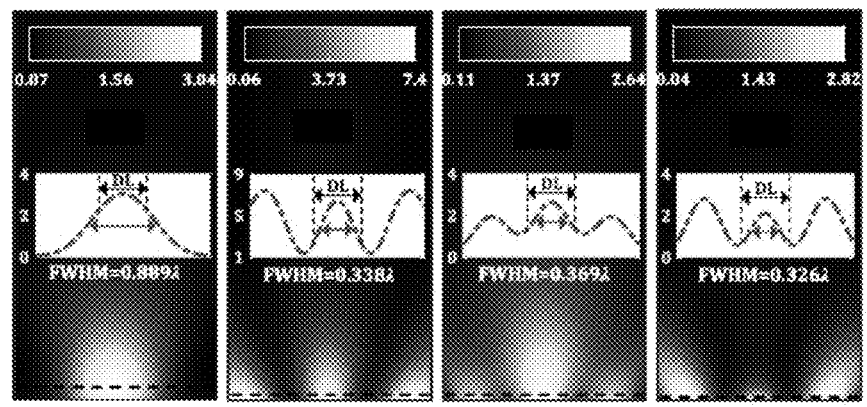
*Fig. 12A*  *Fig. 12B*  *Fig. 12C*  *Fig. 12D*

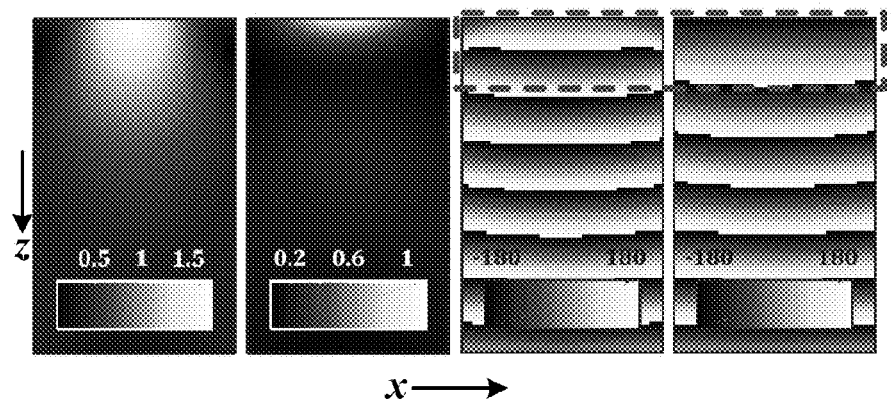
*Fig. 14A*  *Fig. 14B*  *Fig. 14C*  *Fig. 14D*
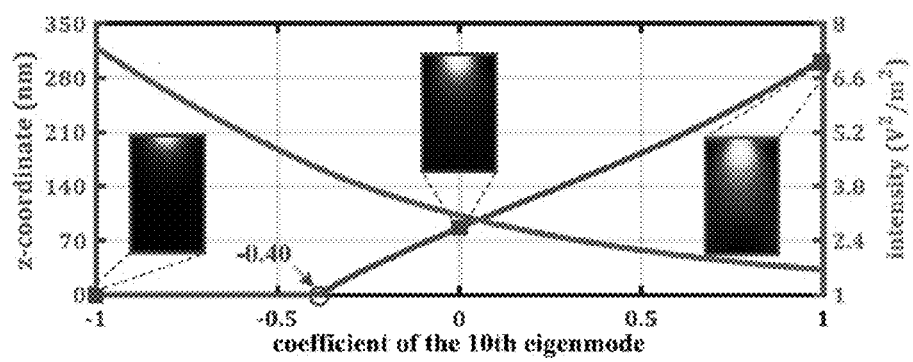
*Fig. 14E*

SPATIAL CONTROL OF THE OPTICAL FOCUSING PROPERTIES OF PHOTONIC NANOJETS

The present application claims priority of U.S. Provisional Patent Application Ser. No. 62/534,816, filed Jul. 20, 2017, and incorporated herein by reference.

TECHNICAL FIELD

The present invention relates to apparatus and methods for focusing light and collecting light. More particularly, the invention relates to focusing light into a high-intensity beam characterized by a subwavelength width and for collecting light from an ultra-narrow spatial volume characterized by subwavelength dimensions.

BACKGROUND ART

Scattering by microspheres or microcylinders is already a perfectly solved problem, the history of which can be traced as far back as Mie, "*Contributions to the optics of turbid media, particularly of colloidal metal solutions,*" Ann. Phys., vol. 25, pp. 377-445 (1908), which provides the analytic solution of scattering by spherical gold particles, and which is incorporated herein by reference.

In 2000, this topic once again generated widespread attention when Lu et al., "*Laser writing of a subwavelength structure on silicon (100) surfaces with particle-enhanced optical irradiation,*" JETP Lett., vol. 72, pp. 457-59, (2000), incorporated herein by reference, reported that an enhanced laser irradiation generated on the shadow side surface of an illuminated dielectric microsphere can write a subwavelength structure on a silicon surface. The enhanced irradiation was named a "photonic nanojet" (PNJ) by Chen et al., "*Photonic nanojet enhancement of backscattering of light by nanoparticles: a potential novel visible-light ultramicroscopy technique,*" Opt. Express, vol. 12, pp. 1214-20 (2004) (hereinafter, "Chen 2004"), incorporated herein by reference.

By using rigorous Mie theory combined with a Debye series expansion, Itagi et al., "*Optics of photonic nanojets,*" J. Opt. Soc. Am. A, vol. 22, pp. 2847-58 (2005), incorporated herein by reference, demonstrated that the focusing behavior of a microsphere or microcylinder is significantly different from that of the conventional solid immersion lens. Particular features of focusing by microspheres or microcylinders enable potentially important applications in the areas of nanoparticle detection, sizing and manipulating nanoscale objects, optical data storage, and maskless direct-write nanopatterning and nanolithography.

Chen et al., "*Highly efficient optical coupling and transport phenomena in chains of dielectric microspheres,*" Opt. Lett., vol. 31, pp. 389-91 (2006), and Kapitonov et al., "*Observation of nanojet-induced modes with small propagation losses in chains of coupled spherical cavities,*" Opt. Lett., vol. 32, pp. 409-11 (2007), both incorporated herein by reference, have reported that a chain consisting of microspheres, either with the same dimension or with size dispersion, can achieve low loss optical transport via the mechanism of whispering gallery modes or nanojet-induced modes, thus opening up the window for microsphere-chain based waveguides and resonators as well as laser surgery.

A variety of other micro- and nanostructures, such as the micro-ellipsoid (Liu, "*Ultra-elongated photonic nanojets generated by a graded-index microellipsoid,*" Prog. Electromagn. Res. Lett., vol. 37, pp. 153-65, 2013), the hemispheric shell (Hengyu et al., "*Photonic jet with ultralong working distance by hemispheric shell,*" Opt. Express, vol. 23, pp. 6626-33, (2015)), and the cuboid (Minin et al., "*Localized photonic jets from flat, three-dimensional dielectric cuboids in the reflection mode,*" Opt. Lett, vol. 40, pp. 2329-32, (2015)), have been demonstrated as efficient PNJ generators. The aforesaid references are incorporated herein by reference.

Although microspheres and microcylinders present exceptional characteristics such as PNJ formation, optical transport with low loss, and super-resolution imaging, some of their inherent properties limit their application. For example, the detection of intrinsic nanostructures and artificially introduced nanoparticles deeply embedded within biological cells requires a long PNJ length, whereas a rapidly convergent PNJ generated by the microsphere or microcylinder is followed by a fast divergence. To obtain a much longer PNJ, the graded-index multi-layer microsphere or microellipsoid, the two-layer dielectric microsphere, the liquid-filled hollow microcylinder, the hemispheric shell, and the microaxicon with specific spatial orientation, have been proposed in recent years. However, the engineering difficulty and complexity of fabricating these PNJ generators, as well as the inevitable side lobes, in turn limit their application in the detection of deeply embedded nanostructures within cells. The side lobes are created from the interference of the unscattered incident field that passes around the edge of the generator, the diverging light of the central lobes of the PNJ, and the light that has scattered multiple times within the generator.

Though a considerable number of publications aiming at exploring the mechanisms beneath the unusual imaging properties of microspheres have appeared in recent years, no complete theoretical model has yet been adduced that can fully explain the observed super-resolution capability of microspheres. The observed characteristics of microspheres likely stem from the combined effects of evanescent wave coupling close to the surface of the microsphere and their conversion into propagating waves, the relatively high refractive index of microsphere that induces shrinkage of the illumination wavelength, and the properties of the PNJ.

Yang et al., "*Super-resolution imaging of a dielectric microsphere is governed by the waist of its photonic nanojet,*" Nano Lett., vol. 16, pp. 4862-70 (2016) (hereinafter, "Yang 2016") incorporated herein by reference, experimentally validated that shrinking the waist of the PNJ of a dielectric microsphere results in higher lateral resolution, paving a reasonable way to guide the design of super-resolution components. Specifically, the goal is to reduce the full width at half maximum (FWHM) waist of the PNJ. The narrow PNJ is vital to confocal microscopy because the imaging performance of a confocal microscope is closely related to how tightly the illumination light can be focused.

Wu et al., "*Modulation of photonic nanojets generated by microspheres decorated with concentric rings,*" Opt. Express, vol. 23, pp. 20096-103 (2015), incorporated herein by reference, reported a PNJ with a FWHM waist of 0.485λ (λ=0.4 μm) by engineering a microsphere with four uniformly distributed rings etched at a depth of 1.2 μm and width of 0.25 μm. However, the smallest FWHM PNJ generated by an isolated structure that has been reported, by Wu et al. and others, is larger than λ/3.

Another noteworthy drawback of the microsphere, which is due to its fully curved surface, is the difficulty in handling, moving, and assembling a single microsphere or, more generally, microsphere arrays. Wang et al., "*Super-resolution optical microscopy based on scannable cantilever-* combined microsphere," *Microsc. Res. Tech.*, vol. 78, pp. 1128-32 (2015), incorporated herein by reference, proposed a cantilever-combined microsphere to scan over the sample surface to form a full image with post-processing. The method works similarly to a near-field scanning microscope (NFSM) and is thus limited by a low serial scanning speed. Others have proposed to embed microspheres into movable thin-films to precisely align the limited field of view (FOV) within a desired location and to meet the demands of large-area inspection. However, thin-films with refractive index larger than 1 inevitably change the ambient of the microspheres. This necessitates large index microspheres in consideration of the refractive index contrast needed to form the PNJ.

Gu et al., *"Subsurface nano-imaging with self-assembled spherical cap optical nanoscopy," Opt. Express*, vol. 24, pp. 4937-48 (2016) (incorporated herein by reference) has proposed a self-assembled spherical cap optical nanoscopy for subsurface nano-imaging, similar to wavelength-scale lens microscopy and shape-controllable microlens arrays developed by others. This design provides a more straightforward way to adjust the effective FOV by moving the substrate and performing image stitching. However, Gu's design, which has only one curved surface, prevents the wavefronts inside the structure from being adequately focused, which may limit the resolution. Gu's structure does not fall within the present definition of an asymmetric structure, as taught and claimed below, because it lacks a waveguide pedestal, which is a critical design element used in the present invention to control the relative phases of the interfering eigenmodes of the waveguide. Moreover, Gu's structure consists of only a single transmissive element.

Recently, low loss and stable optical transport through a chain of microspheres with the same or varied size has been validated and understood as the effect of whispering-gallery modes (WGMs) (as discussed by Chen et al., *"Highly efficient optical coupling and transport phenomena in chains of dielectric microspheres," Opt. Lett.*, vol. 31, 389-91 (2006)) or periodically focused modes (PFMs) (discussed by Allen et al., *"Microsphere-chain waveguides: Focusing and transport properties," Appl. Phys. Lett.*, vol. 105, 021112 (2014)), both of which references are incorporated herein by reference. Generally, in a microsphere-chain, however, the radius is the only degree of freedom (DOF) that can be adjusted to control the photons for a given material and excitation.

With the semiconductor industry demanding decreased critical dimension (CD) and increased circuit intricacy, it is becoming more challenging to balance the requirement of accuracy, non-destruction, and high speed aerial inspection in detecting killer defects on patterned wafers. A method of nanoscale defect detection that does not suffer from the aforesaid deficiencies would be, therefore, highly desirable.

SUMMARY OF EMBODIMENTS OF THE INVENTION

In accordance with embodiments of the invention, methods and apparatus are provided for concentrating light characterized by a central wavelength into a specified focal volume. In one embodiment, the method couples incident light through a plurality of successive transmissive asymmetric microstructure elements.

In other embodiments of the invention, the specified focal volume may be characterized by a waist having an intensity FWHM smaller than half the central wavelength of the incident light. Each of the plurality of successive transmissive asymmetric microstructure elements lacks any symmetry other than about a central propagation vector of the incident light. Each of the successive elements of the microstructure may be characterized by an index of refraction exceeding that of an ambient medium.

In accordance with further embodiments of the present invention, one of the plurality of successive transmissive asymmetric microstructure elements has a hemispherical cap. In another embodiment, one of the plurality of successive transmissive asymmetric elements has a cylindrical cap.

In accordance with yet further embodiments of the present invention, light propagation within the plurality of successive elements is characterized by a succession of energy convergence regions.

The succession of asymmetric microstructure elements is designed in accordance with steps of:
representing an electromagnetic field as a linear combination of eigenmodes of one of the succession of transmissive asymmetric microstructure elements;
representing the succession of transmissive asymmetric microstructure elements as a plurality of mesh lattice units;
obtaining eigenmode solutions to Maxwell's equations for each mesh lattice unit of the succession of transmissive asymmetric microstructure elements subject to consistent boundary conditions;
employing S-matrix formalism to calculate a field output of the succession of transmissive asymmetric microstructure elements for each eigenmode; and
selecting a set of complex-valued coefficient weights to form a linear superposition of the eigenmodes as the input to the succession of transmissive asymmetric microstructure elements to achieve a specified set of field output characteristics.

In accordance with other aspects of the present invention, a method is provided for collecting light from a specified volume, wherein the method couples light from the specified volume through a succession of transmissive asymmetric microstructure elements. Each of the plurality of successive elements may lack any symmetry other than about a central propagation vector of the incident light. Each of the successive elements of the microstructure may be characterized by an index of refraction exceeding that of an ambient medium.

In accordance with other embodiments of the present invention, one of the plurality of successive elements may have a hemispherical cap, or one of the plurality of successive elements may have a cylindrical cap.

In accordance with yet a further aspect of the present invention, a device is provided for forming a photonic nanojet or for collecting light from a specified volume. The device has a plurality of successive transmissive asymmetric microstructure elements configured to receive and transmit an electromagnetic wave.

Each of the plurality of transmissive elements may be characterized by an index of refraction exceeding that of an ambient medium.

In accordance with other embodiments of the present invention, each of the plurality of successive asymmetrical transmissive elements may lack any symmetry other than about the central propagation vector of the incident light. One of the plurality of transmissive elements may have either a hemispherical cap or a cylindrical cap.

BRIEF DESCRIPTION OF THE DRAWINGS

The current patent or application file contains at least one drawing executed in color. Copies of this patent or patent application publication with color drawing(s) will be provided by the Office upon request and payment of the necessary fee.

The foregoing features of the invention will be more readily understood by reference to the following detailed description, taken with reference to the accompanying drawings, in which:

FIG. 4A shows the effect of the length L of the supporting waveguide stage and hemispherical radius r on the focus property, and FIG. 4B shows the fraction of convergent rays for various aspect ratios L/r. FIGS. 4C, 4D and 4E show the full-wave simulations corresponding to the case of fixed $r=1$ μm but varying L, i.e., $L=0$, $10^{0.332}$ and $10^{0.724}$, respectively. The color bars of FIGS. 4C-4E are unified in the range 0-7.0.

FIGS. 4F, 4G and 4H show intensity distributions of the cascaded structure for a fixed $r=3$ μm but varying L, i.e., $L=0$, $10^{0.332}$ and $10^{0.724}$, respectively. In FIG. 4F, a strong PNJ is generated for $\log_{10}(L/r)=0$. In FIG. 4G, very little of the light intensity is focused when $\log_{10}(L/r)=0.332$. FIG. 4H shows an extremely elongated but relatively weaker PNJ, generated when $\log_{10}(L/r)=0.724$. The color bars of FIG. 4F-4H are unified in the range 0-16.

FIG. 7A depicts a spatial intensity distribution of a cascaded structure corresponding to $L=7.4$ μm. FIG. 7B shows a partially enlarged view of the fourth ECR in the cascaded structure, and FIG. 7C shows calculated FWHM waists for various locations of the curved surface of the second asymmetrical element inside the fourth ECR. The color bars of FIGS. 7A and 7B are unified in the range 0-7.8.

FIGS. 8A and 8B show spatial intensity distributions of the cascaded structures corresponding to $L=30$ μm and $L=49.3$ μm, respectively, showing the various ECRs, in accordance with embodiments of the present invention. The color bars of FIGS. 8A and 8B are unified in the range 0-10.

FIGS. 11A and 11B show intensities along the lines $x=0$ and $y=0$ on the cross-section containing the hot spot for the $1^{st}$ (FIG. 11A) and $2^{nd}$ (FIG. 11B) eigenmodes.

FIGS. 12A, 12B, 12C, and 12D depict customized beam shapes on the xz plane ($y=0$) for various coefficient combinations C associated with the first 20 eigenmodes of the waveguide supporting stage. The horizontal and vertical axes represent x and z directions, respectively. The insets in the subfigures are obtained from the black dotted line that passes through the hot spot. The field of view of each subfigure is 810 nm wide by 2000 nm tall.

FIGS. 13A and 13B show unwrapped output phase maps of the $E_x$ components of the $1^{st}$ and $13^{th}$ eigenmodes, respectively, and of the $E_y$ components of the $1^{st}$ and $13^{th}$ eigenmodes in FIGS. 13C and 13D, respectively. FIG. 13E shows a curve of the defined FOM versus $C_{13}$, the coefficient of the $13^{th}$ eigenmodes, for fixed $C_1=1$. FIGS. 13A-13D correspond to the xy plane ($z=0$). The insets in FIG. 13E are intensity distributions of the E field computed on the xz plane ($y=0$). The fields of view for FIGS. 13A-13D are 810 nm wide by 810 nm tall, while those of the insets in FIG. 13E are 810 nm wide by 2000 nm tall.

FIGS. 14A and 14B show amplitudes of the $E_y$ components of the output beams associated with the $1^{st}$ and $10^{th}$ eigenmodes, respectively. FIGS. 14C and 14D show the unwrapped phases of the $E_y$ components of the output beams associated with the $1^{st}$ and $10^{th}$ eigenmodes, respectively. FIG. 14E plots curves of z-coordinates and intensities of the hot spot with respect to the coefficient of the $10^{th}$ eigenmode for fixed $C_1=1$. The field of view of each color graph is 810 nm wide by 2000 nm tall.

DETAILED DESCRIPTION OF EMBODIMENTS OF THE INVENTION

Definitions

The term "microstructure," as used herein and in any appended claims, shall refer to any solid body (whether contiguous or not) with transverse dimensions in the range of one-quarter wavelength to ten wavelengths in size and with axial dimensions in the range of one-quarter wavelength to one thousand wavelengths, where the term "wavelength" refers to a characteristic wavelength of an electromagnetic wave focused in accordance with the present invention. The electromagnetic wave may be monochromatic or polychromatic. The wave may further be fully coherent, partially coherent, or fully incoherent.

The term "photonic nanojet" (or "PNJ") shall apply to any field pattern associated with an electromagnetic wave, whether propagating or evanescent, characterized by a central wavelength, that may be additionally characterized by a transverse field intensity at some axial position having a FWHM smaller than the central wavelength of the electromagnetic wave.

Figures 9A, 9B:
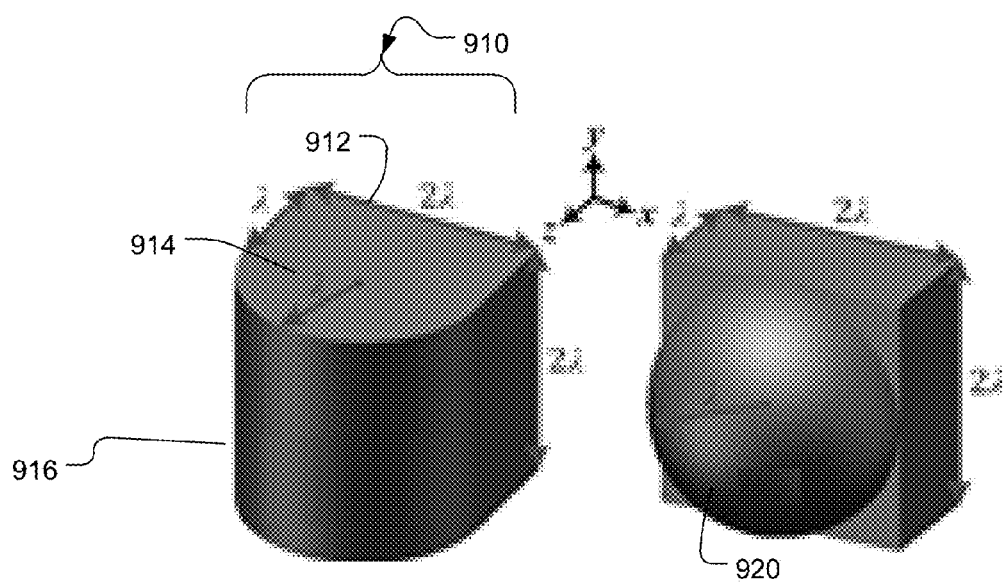
FIG. 9A depicts a halfcylinder and FIG. 9B depicts a hemisphere, each situated on a waveguide supporting stage with identical dimensions and together constituting an asymmetric element in accordance with embodiments of the present invention.

The term "asymmetric," as used herein and in any appended claims, shall refer to any solid body comprising a pedestal with two non-degenerate parallel planar surfaces transverse to a central axis, and a cap adjacent one of the parallel planar surfaces of the pedestal, the cap having a surface curved at least in part. Thus, for example, a half cylinder or a hemisphere, each situated on waveguide supporting stages, as shown respectively in FIGS. 9A and 9B, is each an asymmetric body within the scope of the definition employed herein. "Asymmetric" and "asymmetrical" are used interchangeably herein.

A "PNJ generator" refers to any geometrical structure employed to create a PNJ by transformation of an incident electromagnetic wave.

The "intensity" of an electromagnetic wave expresses the power per unit area in an electromagnetic wave and is expressed in units such as W/m$^2$, or equivalent. The "electric field intensity" expresses the square of the absolute value (modulus) of the electric field amplitude and is expressed in units such as V$^2$/m$^2$, or equivalent. These quantities are proportional to each other in a given medium and are used interchangeably herein.

An "intensity hot spot" 130 (shown in FIG. 1C) refers to a single locus where the value of the intensity of an electromagnetic wave that has traversed a PNJ generator assumes a maximal value.

Figures 1A, 1B:
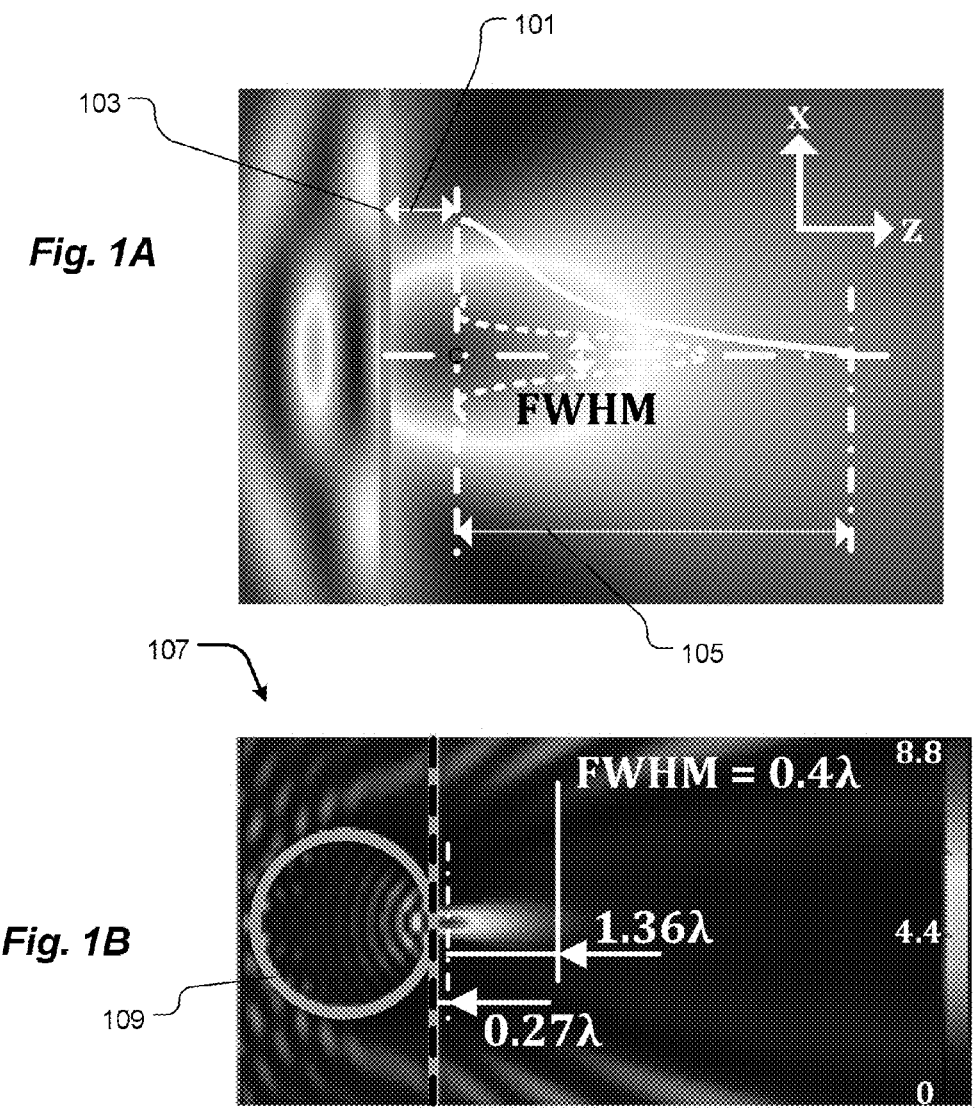
FIG. 1A shows a schematic depiction of a PNJ and an associated spatial intensity distribution.
FIG. 1B depicts a simulation of the spatial intensity distribution of a silica microsphere with a diameter of $4\lambda=1.62$ μm by the illumination of a TE plane wave with $\lambda=0.405$ μm wavelength in air.

Some important parameters used to characterize the PNJ performance are now discussed with reference to FIG. 1A. A "working distance" 101 is defined as the distance between the centroid of the intensity hot spot and a closest point 103 on the surface of a PNJ generator, designated generally by numeral 107 in FIG. 1B. A microsphere 109 in FIG. 1B serves as one example of a PNJ generator. A "length" 105 of the PNJ is defined to be the same as the "diffraction length," through which the light intensity decays to 1/e of its peak value, which, in turn, is the locus of the maximum intensity within the hot spot.

The propagation direction of the beam is designated herein as the "z" direction, while the "x" and "y" directions are transverse to the propagation direction.

The "FWHM waist" is calculated for the plane that contains the hot spot if the hot spot is outside of the PNJ generator, or else it is calculated for the plane that is tangential to the surface on the shadow side of the PNJ generator.

The "focal volume" of a focused electromagnetic beam (whether Gaussian or otherwise) is defined as $$\left(\frac{\pi}{2}\right)^{3/2}$$

times the product of the axial e$^{-2}$ length and square of the lateral e$^{-2}$ radius at the focus of the point spread function (PSF) of the focused electromagnetic beam. The axial e$^{-2}$ extent of a focal volume of a PNJ shall be referred to as the "PNJ length." The narrowest transverse extent of a focal volume, whether or not the wavefront is rigorously constant along that extent, shall be referred to herein as the "waist" of the PNJ.

The term "metalens" refers to a substantially flat surface configured to focus light by virtue of nanostructure embodied thereupon.

A "critical dimension" of an optical structure shall refer to a pertinent length, width, or radius of curvature of the structure in relation to a pertinent wavelength of focused light.

All of the defined parameters used herein refer to a central beam of a PNJ because, typically, the intensity of the central beam in a PNJ is significantly larger than that of the side lobes.

It is generally accepted that as the refractive index of a microsphere decreases, the PNJ reaches further into the background, as has been shown by Shen et al., "*Ultralong photonic nanojet formed by a two-layer dielectric microsphere,*" Opt. Lett., vol. 39, pp. 4120-23 (2014), incorporated herein by reference. Unless otherwise specified, the ambient background, as discussed herein, will be assumed to be air, as a matter of heuristic convenience, with generalization to other background media a matter of obvious extension to a person of ordinary skill in the art.

Unless defined otherwise, all technical and scientific terms used herein have the same meaning as commonly understood by one of skill in the art to which the invention pertains. Although any methods and materials similar to or equivalent to those described herein can be used in the practice or testing of the present invention, the preferred methods and materials are described herein.

Embodiments in accordance with the present invention are now described more fully with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements.

Overview

In accordance with embodiments of the present invention, a novel microstructure is presented for concentrating light into a desired volume. In addition, embodiments of the present invention provide methods and apparatus that use a metalens working in the near-field region to collect and recombine the signature of a structural defect on a patterned wafer, such as one from the 7 nm node, or a patterned wafer of a subsequent process node such as the 5 nm node currently under development, in order to dramatically improve the SNR compared with the SNR of a conventional optical microscope.

It is to be understood that, within the scope of the present invention, the microstructure taught herein may be used, reciprocally, for collecting light within a specified volume.

The lowest available index for 'conventional' optical materials in the visible light frequency range is taken, for purposes of exposition and without limitation, to be around 1.37, which indicates, as will be shown, that the PNJ generated on the shadow side of a microsphere is at most only several wavelengths long followed by a fast divergence. This is illustrated, with reference to FIG. 1B, which depicts a simulation of the spatial intensity distribution of a silica microsphere 109 with a diameter of 4$\lambda$=1.62 µm as illuminated by a TE plane wave with $\lambda$=0.405 µm wavelength in air. Silica is chosen here, for purposes of the present description and without limitation, because of its long-term stability and generality in the semiconductor industry as well as its small refractive index at λ=0.405 µm wavelength, namely, n=1.4696. Moreover, the medium, which is not limited within the scope of the present invention, may be referred to herein as "silica," without loss of generality.

It should be noted that scattering properties of the microsphere cannot be correctly inferred from the trajectory of the ray optics because of the small critical dimension; thus, full-wave treatment is necessary to observe numerically correct scattering behavior. Throughout this article, the wave optics module of COMSOL Multiphysics® Modeling Software (available from COMSOL, Inc., Stockholm, Sweden) was used to model the scattering property of various PNJ generators in 2D. The simulation domain is surrounded by a perfectly matched layer (PML) with a triangular mesh size set to be λ/25, thereby approximating an open domain. (An "open domain," as the term is used herein, is defined as the infinite space into which electromagnetic waves from the simulation domain can propagate. Triangular mesh elements with sizes equal to λ/30 and λ/28 are applied to the silica and air domains, respectively, for ensuring the accuracy of the finite element method. As apparent in FIG. 1B, the wavefronts passing through the surface on the bright side cannot be focused to a single point, but instead lead to a caustic curve whose cusp is outside of the surface.

The working distance 101 and length 105 of the PNJ, as previously defined, with respect to the microsphere of diameter 4λ, are 0.27λ and 1.36λ, respectively. The scattering problem, in terms of reflection and transmission of cylindrical waves at the surface of the microsphere, can be analyzed by resolving the Mie solution into a Debye series, by which the amplitude of the field $R_t$ outside of the microsphere may be represented as the superposition of an infinite number of modes, namely, $$R_t = R_{oo} + \sum_{j=0}^{\infty} T_{io}(R_{ii})^j T_{oi}, \qquad (1)$$

where $R_{oo}$ and $T_{oi}$ are the reflection and transmission coefficients for an incoming cylindrical wave from outside of the microsphere, respectively, and $R_{ii}$ and $T_{io}$ and are the reflection and transmission coefficients for an outgoing cylindrical wave from inside of the microsphere, respectively. Here, i and o indicate if a mode is inside or outside the microsphere, respectively. It has been demonstrated that for the case of a microsphere with a relatively large radius, the predominant contribution to the PNJ comes from the term $T_{io}T_{oi}$ corresponding to the two refractions happening on the two hemispherical surfaces during the propagation of the wavefront, as discussed in Chen 2004. This insight connects the physical and the geometrical optics pictures. It should be kept in mind that the importance of the remaining terms in Eq. (1) increases with the decrease of radius r; thus, for the analysis of a small microsphere, the consideration of more terms in the calculation of $R_t$ becomes necessary. Here, instead of accurately calculating the various terms in Eq. (1), it is preferable to assume that the term $T_{io}T_{oi}$ still contributes the most to the PNJ. Based on the above assumption, it becomes apparent that if an asymmetric structure consisting of a flat support slab and a solid hemisphere of the same radius as the microsphere is illuminated from the flat side by the same plane wave, the hot spot in the PNJ will be pushed further away from the hemisphere surface because refraction only happens on the curved surface. This leads to a longer working distance than that of the microsphere. Again, by assuming that $T_{io}T_{oi}$ dominates the PNJ, the aberration along the propagation direction caused by the hemisphere is deduced to be:

$$\xi = \frac{-2\eta \sin(-0.5J' + 0.5J) \times \sin(0.5J' - 0.5u) \times n_i \times \theta}{n_i \times u' \times \sin(u)}. \qquad (2)$$

In the foregoing expression, η denotes the distance between the point of incidence on the curved surface and the intersection point of the curved surface and the propagation axis. J and J' represent the incident and refractive angles of the far-off axis waves, respectively. u and u' denote the inclined angles of the incident and refracted waves with respect to the propagation axis, respectively. θ denotes the incident angle of the paraxial wave. For the microsphere, the wavefronts propagating through the hemispherical surface on the shadow side have already undergone refraction by the hemispherical surface on the bright side, while those for the asymmetric structure only undergo one wavefront refraction, which means ξ for the microsphere should be smaller than that for the asymmetric structure. Hence, it transpires that an asymmetric structure generates a PNJ with a longer extension than the microsphere. Moreover, it may be noted, from FIG. 1B, that the PNJ of the microsphere 109 is strongly affected by the surrounding background signal because of the interference between the illumination wave and the waves leaking from the non-central area of the hemispherical surface on the shadow side. This effect would also exist in the asymmetric structure case. To reduce the effect of the background signal on the PNJ, the non-working area, i.e., the flat portion of the shadow side, is coated, in one embodiment of the present invention, with a gold thin film. (The term "shadow side" refers to a side of an optical structure adjacent to the second surface of the structure traversed by a Poynting vector of an incident electromagnetic wave.)

Simulation of an Asymmetrical Structure with a Hemispherical Surface

Figures 1C, 1D:
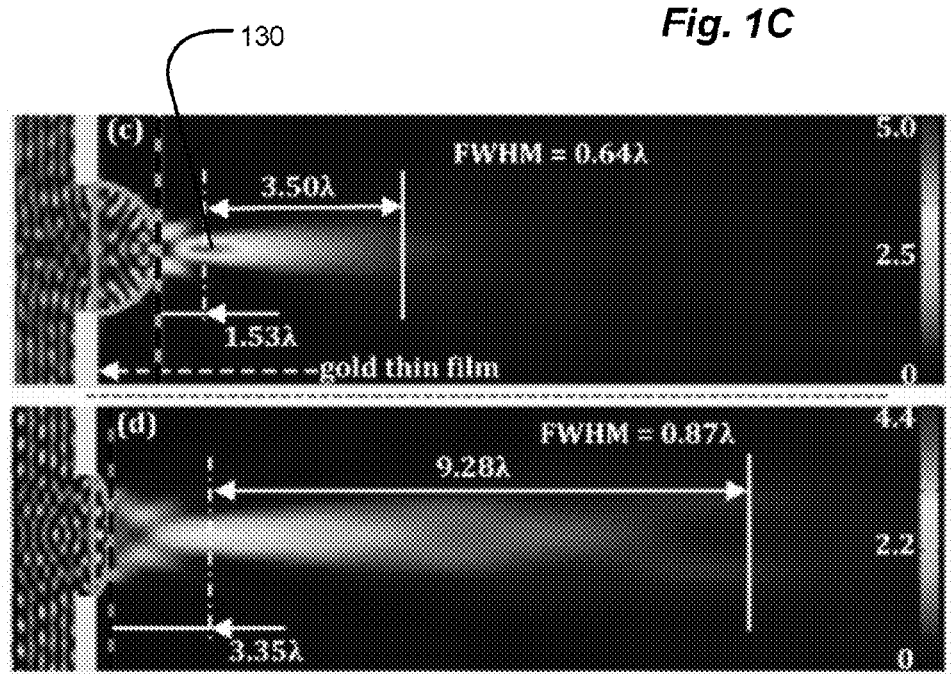
FIG. 1C shows the same simulation for an asymmetric structure in accordance with an embodiment of the present invention with the radius of curvature equaling $2\lambda$ (i.e., a hemisphere), while, in FIG. 1D, the radius of curvature equals $4\lambda$ (i.e., a spherical cap). The clear aperture in FIGS. 1A and 1B is $4\lambda$. The orange and black dotted line represents the tangent of the PNJ generator on the shadow side.

To validate the above assumption, namely that that the term $T_{io}T_{oi}$ is the dominant contributory term to the PNJ, the spatial field distribution was modeled for an asymmetrical structure that has a hemispherical surface with the same diameter as the microsphere discussed above with respect to FIG. 1B. As can be seen in FIG. 1C, a design in accordance with an embodiment of the present invention generates a longer working distance (1.53λ) and length of PNJ (3.50λ) when compared with that of the silica microsphere 109 (0.27λ and 1.36λ, respectively) of FIG. 1B. It is to be expected that by immersing the asymmetrical structure inside a liquid, a significantly longer PNJ can also be generated on the basis of ray optics, similar to what was done in Gu et al., "*Super-long photonic nanojet generated from liquid filled hollow microcylinder,*" Opt. Lett., vol. 40, 625-28 (2015)., incorporated herein by reference.

Moreover, it may be observed that most of the background signal around the PNJ has been cleaned up because of the coated gold film and because of the waveguide supporting stage, which may result in a longer effective length of the PNJ in practice. From Eq. (2), it may be deduced that a refraction surface with a larger radius of curvature (ROC) can generate a larger aberration, which will further extend the length of the PNJ in air. Another simulation was performed in which the size of the opening in the gold film was fixed to be the same as that of FIG. 1C, but replacing the hemispherical surface with a spherical cap that has a larger ROC, i.e., 4λ. As apparent from FIG. 1D, the larger ROC results in a far larger length of the PNJ (9.28λ), accompanied by an increase of FWHM waist (0.87λ). The ROC of the curved surface was further varied, with the clear aperture fixed. The resulting working distance, length of PNJ, and FWHM waist are presented in Table 1, showing an extension of the PNJ with increase of ROC.

TABLE 1

The working distance, PNJ length, and FWHM waist of the designed asymmetrical structure with various radii of curvature and a fixed clear aperture (4λ). The focusing surface is a hemisphere for ROC = 2λ and a spherical cap for ROC > 2λ. All tabulated values have been normalized by the illumination wavelength.

| radius of curvature | 2λ | 3λ | 4λ | 5λ |
|---|---|---|---|---|
| working distance | 1.53λ | 2.65λ | 3.35λ | 3.28λ |
| PNJ length | 3.50λ | 5.86λ | 9.28λ | 11.52λ |
| FWHM waist | 0.64λ | 0.81λ | 0.87λ | 0.89λ |

Because the limiting case has an infinite ROC, the PNJ may be extended, in theory, to any arbitrary length. However, extending the PNJ length is inevitably accompanied by an increase of the FWHM waist and a decrease of the PNJ intensity. It is to be noted that the assumption of predominant $T_{io} T_{oi}$ can only be applied to qualitatively guide the design of an effective PNJ generator and it is preferred that more terms in Eq. (1) be calculated in order to quantitatively analyze the PNJ characteristics.

The above simulation indicates that an arbitrarily elongated PNJ may be obtained by varying the ROC of the curved surface. Trends in PNJ working distance, length, and FWHM waist are now described with respect to varying the clear aperture of designs in accordance with embodiments of the present invention relative to the conventional microsphere. A hemispherical focusing surface is assumed in designs in accordance with embodiments of the present invention. The clear aperture variation range is prescribed as 2λ-6λ. As can be seen from FIG. 2A, the working distances of both a conventional microsphere and a design in accordance with an embodiment of the present invention exhibit a strong linear relationship with the clear aperture. Linearity in accordance with embodiments of the present invention may advantageously exceed that of the microsphere. The fitted lines for the two cases are y=0.1209x−0.1233 and y=0.7022x−0.5038, for the microsphere and an embodiment of the present invention, respectively. This implies that the PNJ in accordance with the embodiment of the present invention is pushed away at a far larger rate than that of the microsphere with the increase of the critical design dimension, i.e., the clear aperture.

In further exploring the relationship between the length of the PNJ and the clear aperture, a quasi-linearity was observed for both the microsphere and designs in accordance with embodiments of the present invention. From FIG. 2B, the relation is found not to be as linear for the embodiment of the present invention as it is for the microsphere, but it still can be approximated by the fitted line y=0.6958x+0.3375, whose slope is over 2 times larger than the fitted line y=0.3093x+0.0114 of the microsphere.

Figures 2A, 2B, 2C:
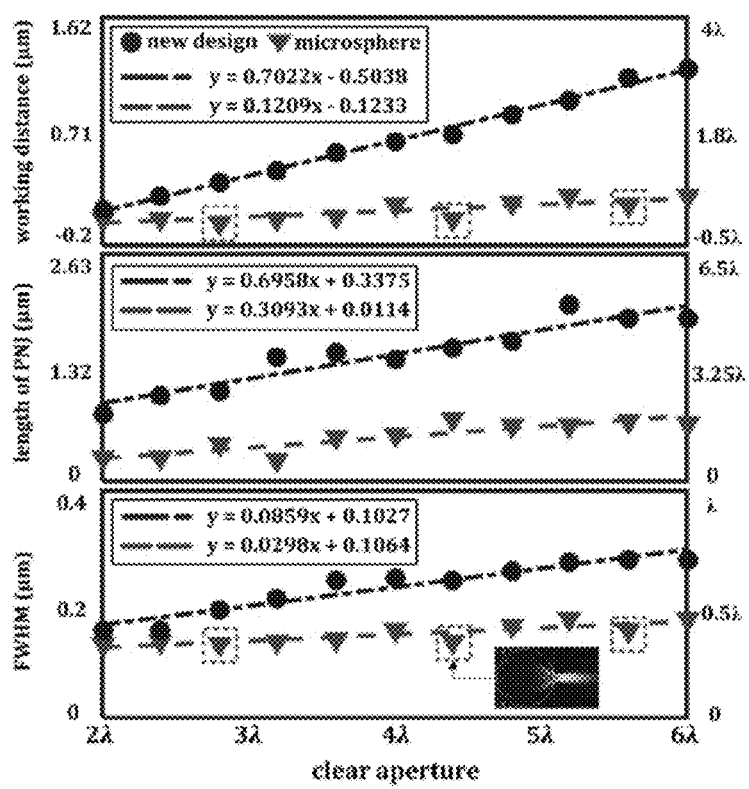
FIGS. 2A, 2B and 2C show scatter plots of the relationship of working distance, length of PNJ, and FWHM, respectively, in accordance with an embodiment of the present invention. The bottom and right axes of each of FIGS. 2A-2C have been normalized by the illumination wavelength.

FIG. 2C graphs calculated FWHM waists of the PNJs in the plane of maximal field amplitude for a conventional microsphere and an embodiment in accordance with the present invention. It appears that the conventional microsphere yields narrower FWHM waists than the studied embodiment of the present invention for all the clear apertures, which indicates there is a compromise between the FWHM and the sum of working distance and length of PNJ. Moreover, the third, seventh, and tenth points in FIG. 2C for the microsphere are found to be anomalous because their FWHM waists are obviously smaller than those of their neighbors. By checking the intensity distribution pattern with respect to the seventh point, it was found that the hot spot is located on the surface of the microsphere. This indicates that the evanescent waves around the shadow side surface of the microsphere significantly contribute to the PNJ, resulting in a narrower FWHM waist. For the third and tenth points, the corresponding working distances are also smaller than those of their surrounding neighbors. In contrast, in the studied embodiment of the present invention, the PNJ has been pushed away from the hemispherical surface; thus, the effect of the evanescent waves on the PNJ is negligible. This may explain the larger FWHM waist in addition to the propagation wave interference after the surface refraction.

Optical Transport

Various designs in which a cascade of asymmetric structures may guide light are now described. One design in accordance with an embodiment of the present invention has three independent DOFs; the length of the waveguide supporting stage serves as another important DOF in addition to the clear aperture and the radius of curvature, whose effects were explored above. For simplicity of explication, description will be limited to 2 DOFs, considering the case of a hemispherical focusing surface. To gain insight into how light behaves in a chain of asymmetrical structures, a geometrical optics approximation is initially applied to each interface and inside of each structure. Although the geometrical optics approximation cannot fully characterize the photon behavior at the microscale, it provides a qualitative physical explanation of the observations.

Optical Waves in the Cascaded Structure

Figure 3A:
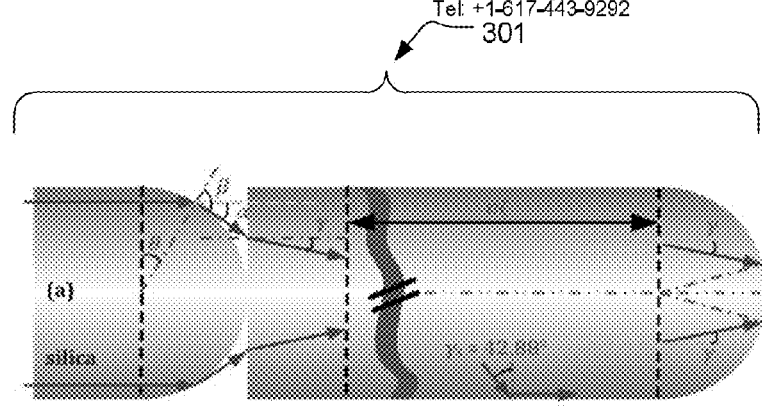
FIG. 3A Illustrated diagram shows optical waves propagating in the cascaded structure consisting of two asymmetrical elements, and FIG. 3B plots the refracted angles $\alpha$ and $\gamma$ given, respectively, by Eqns. 3 and 4, below, in accordance with an embodiment of the present invention.
Figure 3B:
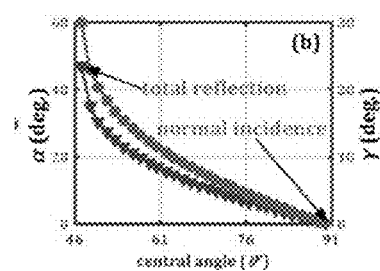

As now described with reference to FIG. 3A-3B, a cascaded structure, designated generally by numeral 301, is considered with two asymmetrical elements, which is illuminated by a monochromatic TE plane wave with the wavelength λ=0.405 μm and with the unit intensity from the left boundary of the computational domain towards the right along the principal axis. Rays that can escape from the curved surface of the first asymmetrical structure should fulfill the relation θ≥arcos $(1/n_s)$ to avoid total internal reflection, where θ and $n_s$ are the central angle and the refractive index of the structure, respectively, as shown in FIG. 3(a). Under this restriction, it is readily deduced that $$\alpha = \arcsin[n_s \cos(\theta)] - 90° + \theta,$$

$$s.t.\ 90° \geq \theta \geq 90° - \arcsin(1/n_s), \quad (3)$$

where α is defined as α=β−(90°−θ). Here, β is the refractive angle with respect to the first hemispherical surface. By plotting the curve for α given by Eq. (3) in FIG. 3B, α is found to be a monotonically decreasing function of the central angle θ. Further, a quick calculation reveals that the maximal incident angle $\alpha_{max}$ on the flat surface of the second asymmetrical element exactly equals the minimum central angle $\theta_{min}$. For that case, the maximum of the refraction angle $\gamma_{max}$ is 29.90°, which is far smaller than the critical angle for total internal reflection inside the waveguide supporting stage, $\gamma_t$=42.88°. Hence, the optical waves output from the first asymmetrical structure can be firmly confined in the waveguide supporting stage of the second element.

Focus at the End of a Cascaded Structure

Although the output rays from the first asymmetrical element can be confined into the second element, the propagation angles of the optical rays inside the second element differ from each other. They are given by $$\gamma = \arcsin\left(\frac{\sin(\alpha)}{n_s}\right), \quad (4)$$

where $\alpha$ is defined in Eq. (3). The various propagation angles of the rays inside the second element complicate the focusing property of the output hemispherical surface. To analyze the characteristics of the focusing, the path of a specific ray may be followed during its propagation inside the cascaded structure, as shown in FIG. 4A.

FIG. 4A shows the effect of the length L of the waveguide supporting stage and hemispherical radius r on the focus property, and FIG. 4B shows the fraction of convergent rays for various aspect ratios L/r. FIGS. 4C-4E show full-wave simulations corresponding to the case of fixed r=1 μm but varying L, i.e., L=0, $10^{0.332}$ and $10^{0.724}$, respectively. The color bars of FIGS. 4C-4E are unified in the range 0-7.0.

Here, the analysis can be simplified by considering the axial symmetry of the cascaded structure. An optical ray corresponding to a central angle $\theta$ is expected to reach a point on the flat surface of the second element with a radial offset $\Delta$ that is given by $$\Delta = r\cos(\theta) - r\tan(\alpha) + r\sin(\theta)\tan(\alpha), \quad (5)$$

where r is the radius of the hemispherical surface of the first element. The optical wave inside the second element undergoes up and down total internal reflection periodically. Assuming the width of the waveguide supporting stage is 2r, the pitch $\zeta$ along the principal axis is given by $$\zeta = 4r\cot(\gamma), \quad (6)$$

where $\gamma$ is defined in Eq. (4).

Whether an optical ray can be focused at the output of the second element depends on the relative position of the circular surface of the second element with respect to the path of optical ray. Specifically, in the case as shown in FIG. 4A, focus happens when the ray is bent by the final curved surface towards the principal axis. No analytic method currently exists that can be used to predict the total focusing property of the cascaded structure. Instead, an approximate approach has been employed by the inventors to analyze the total focusing property by discretizing the space of the central angle $\theta$ and formulating three separate inequality systems that account for the focusing property of each ray with respect to a specific $\theta$. Details may be found in the Appendix to Zhu et al., "Spatial control of photonic nanojets," Opt. Express, vol. 24, pp. 30444-54 (December, 2016)(hereinafter, "Zhu 2016"), all of which paper is incorporated herein by reference. Note that in the practical case of plane wave illumination, the intensity distribution is not equally distributed in $\theta$, but rather in the $\cos(\theta)$, i.e., the axial position. Thus, for purposes of simulation, the range of $\cos(\theta)$ was discretized into 103 sampling points, and each point corresponds to a specific optical ray.

A parameter called the "convergence ratio" is defined herein to be the ratio of the number of convergent rays escaping from the shadow side of the cascaded structure to the total number of rays under consideration. The convergence ratio depends on angles and thus on the aspect ratio L/r of the structure rather than on L or on r individually. FIG. 4B shows that the convergence ratio starts at its maximum value of 67.1% when the length of the waveguide supporting stage equals zero because most of the rays fulfill the first inequality system in Eq. (7) of Zhu 2016. The convergence ratio continually decreases and reaches its minimal value of 1.4% at the point 0.332. At this value, no rays satisfy the first or third inequality systems and very few rays satisfy the second inequality system. The three inequality systems have their own dominant regions, as marked in FIG. 4B. For larger values of L/r, the convergence ratio curve grows sharply until it reaches a local maximal value of 54.6% at the point $\log_{10}(L/r)=0.724$, after which it declines quickly and finally stabilizes around 33%.

The convergence ratio cannot predict the intensity of the focus because the intensity is affected not only by the focusing of the rays but also by interference effects, i.e., the phases of the various rays. Thus, in order to obtain the pattern and intensity distribution of the foci, a full-wave treatment is still required. Nevertheless, the convergence ratio can guide the design of the length of the cascaded structure to some extent. For example, because the convergence ratio near the point $\log_{10}(L/r)=0.332$ is pretty small, L/r should be carefully chosen to ensure that we avoid this region in order for us to achieve efficient energy focusing. For smaller values of L/r, a bright spot with short PNJ length may be generated. As validated in Appendix G of Zhu 2016, the range 0.332 to 1.500 leads to elongated PNJs that have weak intensity because this region is dominated by the rays fulfilling the second inequality system and thus have very small inclined angles with respect to the principal axis.

Figure 4H:
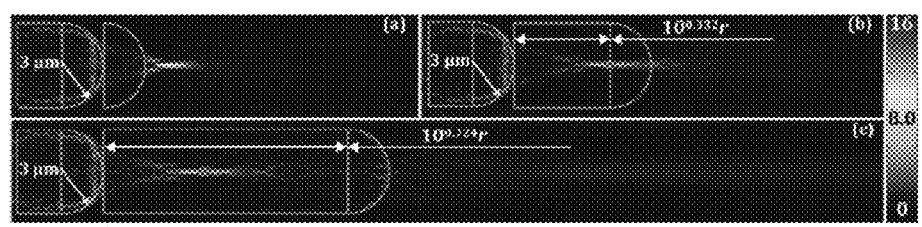

To validate the foregoing, full-wave simulations were performed corresponding to the points $\log_{10}(L/r)=0$, 0.332 and 0.724 with the radius r is fixed at 1 μm and 3 μm. The 1 μm cases are shown in FIGS. 4C-4E and the corresponding 3 μm cases are shown in FIGS. 4F-4H. As shown in FIG. 4C, the L=0 case indeed results in a bright focus outside the cascaded structure, but at the same time there is energy leaking from the non-central area of the curved surface. The difference in the intensity patterns between FIG. 4C and FIG. 4F illustrates how geometrical optics break down for small critical dimensions. Optical diffraction becomes important. Diffraction also affects the shape of the foci. In particular, a focus still exists for the design corresponding to the minimal convergence ratio point, as shown in FIG. 4D. However, compared with the focus in FIG. 4C, the intensity of the focus in FIG. 4D is much weaker, which, to some extent, still validates the use of the convergence ratio to guide the design. For the case $L=10^{0.724}r$ in FIG. 4E, there exist intensity maxima inside the hemisphere's circumference, a very long tail extended along the positive direction of the principal axis because of the second governing inequality system, and a small PNJ generated near the hemisphere, which is a little bit different from the r=3 μm case shown in FIG. 4H. The effect of optical diffraction may also result in noticeable PNJs for other geometries with low convergence ratio values. The above analysis shows that unlike the microsphere, the length of the waveguide supporting stage of the asymmetrical structure also plays a vital role on the focusing property. Thus, it is possible to fix the radius and adjust only the length of the waveguide supporting stage to get the desired focus. This flexibility makes structures in accordance with embodiments of the present invention much easier to be realized compared with the microsphere.

FIG. 5. (a-c) Spatial intensity distribution maps showing the effect of length L of the waveguide supporting stage and number of cascaded elements on the optical transport. (d-f)

Figures 5A, 5B, 5C, 5D, 5E, 5F:
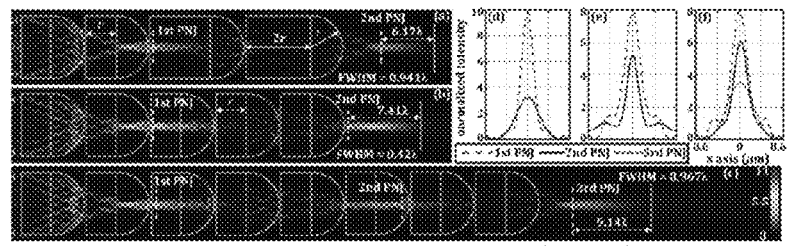
FIGS. 5A, 5B and 5C depict spatial intensity distribution maps showing the effect of length L of the waveguide supporting stage and number of cascaded elements on the optical transport.
FIGS. 5D, 5E and 5F show comparisons of the PNJ hot-spot cross-sectional profiles corresponding to FIGS. 5(a)-5(c), respectively. The scattering loss can be inferred from the decrease in the peak value. The color bars of FIGS. 5A-5C are unified in the range 0-11. The horizontal axis labels and ranges of FIG. 5D and FIG. 5E are set as the same as that of FIG. 5F.

Comparisons of the PNJ hot-spot cross-sectional profiles corresponding to FIGS. 5(a)-5(c), respectively. The scattering loss can be inferred from the decrease in the peak value. The color bars of FIGS. 5(a)-5(c) are unified in the range 0-11. The horizontal axis labels and ranges of FIG. 5(d) and FIG. 5(e) are set as the same as that of FIG. 5(f).

Because the second element is capable of confining the optical waves, it is natural to think that for a short chain consisting of 2 or 4 elements, the asymmetrical structure may result in lower loss than the microsphere. However, the loss may increase when the number of asymmetrical elements in a chain is large if total internal reflection fails in the following contact areas due to the asymmetry. Fortunately, in FIG. 4 we have demonstrated that the length L of the waveguide supporting stage of each element is vital to the focusing property; hence, we can adjust both L and radius of each element to reduce the overall scattering loss. FIG. 5(a) presents the intensity distribution for a chain consisting of four elements where the first two elements have shorter waveguide supporting stages than the last two elements. The radius of the hemisphere is set as 4λ. Obviously, by directly observing the image contrast, we can find that the optical transport process is accompanied by a strong loss. The loss level can be characterized by comparing the highest intensity of the 1st PNJ with that of the 2nd PNJ, as shown in FIG. 5(d). The stronger loss will result in a smaller peak value of the 2nd PNJ.

Now let us consider replacing the two elements at the end of the chain in FIG. 5(a) by three identical elements and redo the simulation under the same illumination condition. We then clearly observe that the scattering loss is remarkably reduced in FIG. 5(b), as is also demonstrated in FIG. 5(e). Moreover, the chain consisting of 5 identical elements also results in an output PNJ with a sub-wavelength FWHM waist and an ultra-long extension up to 7.41λ, which is far better than the performance in FIG. 5(a). By adding three more elements at the end of the chain presented in FIG. 5(b), we find that the intensity of the output PNJ is also reduced but with nearly the same loss level as that of the 5-element chain, as presented in FIG. 5(f). The length of the 3rd PNJ reaches 9.14λ, but the FWHM waist increases to 0.967λ, which may due to the fact that the PNJ is pushed away from the surface of the cascaded structure so that the evanescent waves cannot contribute significantly to the PNJ. We believe by tailoring the waveguide supporting stage length of each element in a chain, it is possible to realize ultra-low loss optical transport in a similar manner as a disordered microsphere-chain [16]. In fact, in the next section, we show that we can achieve very long optical transport with just a two element cascade by using the supporting stage of the second element as a multimode waveguide.

Realizing Ultra-Narrow PNJ

Yang 2016 experimentally validated that this super-resolution imaging property of a dielectric microsphere is governed by the waist of its PNJ. Although such a claim appears to be slightly controversial in the scope of dielectric-microsphere-based super-resolution imaging, reducing the FWHM waist of the illumination source is still vital to some optical imaging setups, such as confocal microscopy. The smallest reported FWHM in air for a PNJ of any dielectric microsphere or more complex isolated structure is larger than λ/3. In this section, a cascade of two asymmetrical elements with different waveguide supporting stage lengths is shown that can generate a PNJ with a FWHM waist consistently smaller than λ/3 in air. The scope of the present invention is not limited by the size of the waist that may be achieved.

As discussed above with reference to FIG. 4, a chain consisting of two asymmetrical elements illuminated by a plane wave parallel to the principal axis can confine the light waves by the principle of total internal reflection from the geometrical optics point of view. An optical ray corresponding to a specific central angle θ will constructively or destructively interfere with the other rays, which may lead to a series of hot spots (constructive interference) and dark specks inside the cascaded structure along the principal axis because of the geometrical symmetry.

Figures 6A, 6B, 6C, 6D:
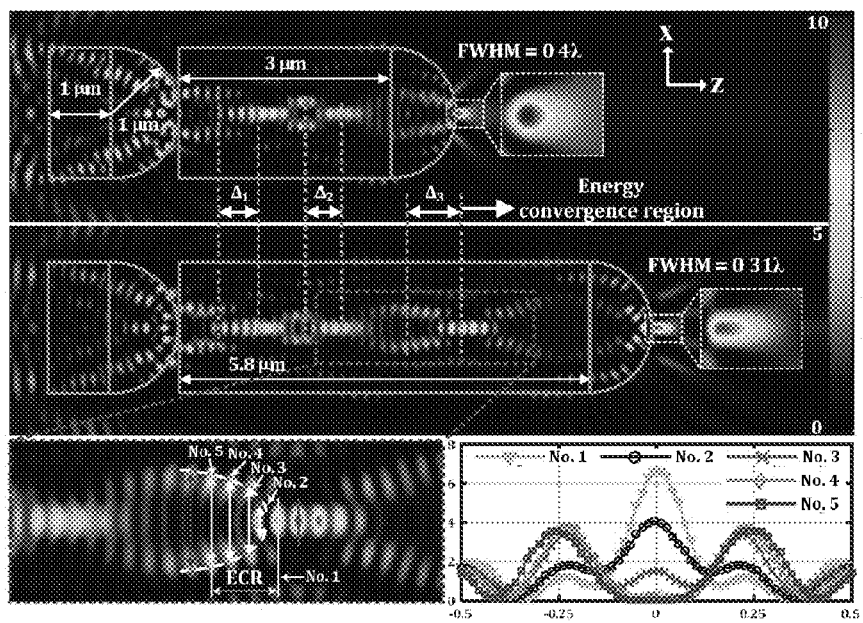
FIGS. 6A and 6B depict spatial intensity distribution maps for the cascaded structures corresponding to $L=3$ μm (FIG. 6A) and $L=5.8$ μm (FIG. 6B) of the second element.
FIG. 6C is an illustrative diagram showing the definition of an energy convergence region (ECR) and FIG. 6D shows an intensity distribution curve along the transverse direction at the center of each pair of hot spots inside the ECR. The color bars of the subfigures are unified in the range 0-10.

A two-element cascaded structure was studied that consisted of a fixed geometry asymmetrical element (r=1 μm and L=1 μm) and an L-varied r-fixed (r=1 μm) asymmetrical element. FIG. 6A illustrates the spatial intensity distribution with respect to the case of L=3 μm. Here, an output PNJ emerges with 0.4λ FWHM waist and two chains of sequential hot spots inside the second asymmetrical element. The difference in the lengths and pattern shapes of the two chains stem from the interference of the diffracted waves with different tilt angles and amplitudes due to the refraction on the curved surface of the first asymmetrical element and the flat surface of the second element. In this example, the spatial field inside the second element may be seen to be inhomogeneous and it is not periodically distributed; thus, by changing the length L of the second element the pattern shape of the output PNJ may be changed. The length of the waveguide supporting stage of the second element was set to be 5.8 μm and the result is shown in FIG. 6B. Obviously, the pattern shape of the output PNJ, which has a FWHM waist of 0.31λ, differs from that in FIG. 6B.

The ultra-narrow FWHM waist makes it possible to achieve super-resolution that goes beyond the limits of the conventional dielectric microsphere. Interestingly, by comparing FIGS. 6A and 6B, some regions, as marked by the white two-way arrows, are found in which the energy tends to converge to hot spots along the extension direction of the second element. These regions may be referred to herein as "energy convergence regions" (ECRs). As shown in FIG. 6C, there is a pattern consisting of several pairs of bright specks in between two chains of hot spots. The pair of bright specks that has the largest separation in x is designated by a red two-way arrow. The next pair of bright specks to the right is marked with a yellow two-way arrow. The yellow arrow sets the left margin of the ECR. The hot spot that has the largest peak value in the right chain of hot spots is marked by a red line, after which the location of the second largest hot spot to the left in the same chain is set as the right margin of the ECR, as marked by a yellow line. An "ECR" is a region in which constructive interference patterns converge to form a focus.

Intensities along the transverse cross section of each pair of bright specks for the ECR shown in FIG. 6C are presented in FIG. 6D. The central lobe of the intensity curve is found to increase while the side lobes decrease along the z direction. This phenomenon, which can be understood as an increase of the total light energy stored in the central lobe area of each pair of bright specks along the z direction from mathematical point of view, distinctly makes the name ECR appropriate. By comparing FIGS. 6(a) and 6(b), we can find that the lengths of the ECRs are nearly the same. The only difference happens in the field amplitude and this difference is due to the different paths of the back reflection waves from the curved surfaces of the second elements. By making a further comparison, we observed that the location where the output PNJ in FIG. 6(a) is generated happens to be inside the ECR in FIG. 6(b), which enables us to believe that there must be a relationship between the output PNJ and the ECR.

As has already been discussed in the above sections, the high optical intensity in the ECR stems from the constructive interference of some of the diffracted waves. This indicates that a noticeable portion of these waves must be reflected by the upper or lower boundaries of the second element and thereafter would be propagating towards the principal axis in the ECR. Hence, similar to the analysis for the rays working in the third inequality system presented in Appendix F of Zhu 2016, continuously moving a curved surface inside the ECR is predicted to result in PNJs with small FWHM waists. FIG. 7A presents the spatial intensity distribution corresponding to a structure with a length L=7.4 µm, in which four ECRs as marked by $\Delta_1$ to $\Delta_4$ are clearly observed. We vary the length L from 5.45 µm to 6.3 µm with a 0.05 µm step to ensure that the curved surface of the second element is always within the fourth ECR, as shown in FIG. 7B. For each position, we find that there is a PNJ on the shadow side of the cascaded structure. We then calculate the FWHM waists of the output PNJs and plot them in FIG. 7C, in which we can clearly see that super-resolution always exists when the second curved surface is placed inside this ECR. Moreover, in the first half of the ECR, the FWHM waists are nearly all smaller than $\lambda/3$ and the smallest one, which is $0.272\lambda$, even approaches $\lambda/4$. Because each scatter plot data point in FIG. 7C corresponds to the case where the curved output surface is inside an ECR, the intensity of the generated central beam is significantly larger than that of the side lobes.

FIG. 8. Spatial intensity distribution of the cascaded structures corresponding to (a) L=30 µm and (b) L=49.3 µm for showing the various ECRs. The color bars of FIGS. 8(a) and 8(b) are unified in the range 0-10.

The above results indicate that the length of the ECR determines the tolerance for the length of the waveguide supporting stage of the second element to ensure super-resolution. The existence of this tolerance is vital for actual fabrication because the variation in the fabrication process prevents the true geometrical dimensions from equaling the design values. The length of ECR is preferably as long as possible to provide a large fabrication tolerance. As can be seen in FIG. 7A, the length of the ECR increases with z. The supporting stage is a multimode waveguide. Thus, it is no surprise that the calculated intensity pattern in the supporting stage is similar to that one inside a multimode interferometer (MMI). However, unlike the typical MMI, the chains of hot spots inside the cascaded structure are reproduced at aperiodic intervals along the propagation direction because of the non-uniform input illumination. As can be viewed in FIG. 7A, the first asymmetric element focuses the light and thus there is a distribution of diffracted waves along the x direction on the flat surface of the second asymmetric element. Although the locations and sizes of the ECRs are aperiodic, the ability to guide waves in the support structure enables the design of a PNJ with an ultra-narrow FWHM waist using an ultra-long second asymmetrical element and PNJ transport across ultra-long distances.

TABLE 2

Lengths and maximal intensities of ECRs. The unit of length and electric field intensity are unified as µm and $kg^2m^2/(s^6A^2)$, respectively.

|  | $\Delta_1$ | $\Delta_2$ | $\Delta_3$ | $\Delta_4$ | $\Delta_5$ | $\Delta_6$ | $\Delta_7$ |
|---|---|---|---|---|---|---|---|
| length | 0.412 | 0.437 | 0.737 | 1.212 | 1.927 | 0.935 | 0.683 |
| intensity | 6.03 | 6.57 | 5.86 | 6.82 | 3.68 | 3.17 | 8.19 |

As validation of the above hypothesis, the intensity pattern for a cascaded structure was first simulated with L=30 µm, as presented in FIG. 8A and Table 2. The lengths of the ECRs initially undergo a rapid increase for the first five ECRs marked by $\Delta_1$ to $\Delta_5$, but then start to decrease beginning with the sixth ECR. This suggests that the ECR characteristics repeat along the propagation direction to some extent. It was also found that the maximal intensities in the fifth and sixth ECRs are smaller than those of the first four ones (as shown in Table 2), which indicates that destructive interference is prominent. Under this circumstance, putting the curved surface of the second element in the corresponding ECR may either lead to a dark PNJ or result in a wide-FWHM PNJ. This should be carefully dealt with by adjusting the hemispherical radius and the length of the asymmetrical elements. Moreover, it is to be noted that for L=30 µm, the location of the curved surface of the second element happens to be outside of an ECR, which leads to a weak PNJ, as can be viewed from the right of FIG. 8A.

The case of L=49.3 µm was then simulated to ensure that the curved surface of the second asymmetric element is located inside an ECR, as shown in FIG. 8B. A PNJ with a FWHM waist $0.286\lambda$, is generated on the shadow side of the cascaded structure again. Thus, an ultra-narrow PNJ has been generated at a distance of hundreds of wavelengths from the first element. The first seven ECRs for the L=30 µm and L=49.3 µm cases were found to have nearly the same lengths and only to differ in their intensities, confirming that the properties of the PNJ may be engineered by controlling the device dimensions.

Microstructure Design for Concentrating Light into a Desired Volume

Control of the focusing properties of light is of great importance for scientific research, instrument development, and engineering applications. For instance, the detection of intrinsic nanostructures or nanoparticles deeply embedded within biological cells requires a long focus, the trapping of large dielectric particles requires a strong optical gradient field, and super-resolution imaging requires an ultra-narrow illumination beam.

It is preferable that the design be easily fabricated and, at the same time, that it generate a long PNJ with a small FWHM waist and a wide FOV. Unfortunately, similar to the classical imaging theory, a tradeoff exists among these primary objectives. The properties of an asymmetrical silica microstructure have been systematically explored and, in accordance with embodiments of the present invention as taught in detail herein, an ultra-elongated PNJ may be achieved. By properly tuning the geometrical parameters, a cascaded asymmetrical silica microstructure may advantageously produce a stable optical transfer and a FWHM waist that approaches $\lambda/4$.

These asymmetric structures may advantageously offer new capabilities such as the detection of deeply embedded nanostructures in cells, ultra-high density optical storage, and the realization of a label-free, ultra-high resolution integrable nanoscopy system.

Design of PNJs Using Eigenmode Expansion (EME) and Transmission Matrix Theory

As now further described, expansion into eigenmodes and transmission matrix theory may be employed, in accordance with embodiments of the present invention, to engineer PNJs using the linear response of the waveguide supporting stage of the asymmetrical microstructure described above. The formalism to be described may advantageously facilitate the customization of complex output beam shapes that include deep sub-wavelength, steering angle-controllable, and adjustable working distance hot spots. While the case of a pedestal with a square cross section is discussed herein, and is shown, for example, in FIGS. 9A and 9B, it is to be understood that the cross section of the pedestal may have any shape and moreover, the cross sectional shape may change along the length of the central axis, within the scope of the present invention.

Referring to FIG. 9A, one $SiO_2$ asymmetrical microstructure 910, consists of a waveguide supporting stage 912 and half-cylinder 914. The illumination wavelength is fixed at $\lambda=405$ nm as an example, for the heuristic purposes of the present description. The dimension of the waveguide supporting stage 912 is taken to be $2\lambda$ wide by $2\lambda$ tall by $1\lambda$ long, and the cylinder radius is set as $1\lambda$ all dimensions by way of example only, and without limitation. Considering supporting stage 912 as a rectangular waveguide, any field inside it can be represented as a linear combination of the eigenmodes of the supporting stage:

$$E(x, y, z) = \sum_{j=1}^{\infty} (A_j \exp^{i\beta_j z} + B_j \exp^{-i\beta_j z}) e_j(x, y), \quad (7)$$

where $e_j(x, y)$ is the normalized $j^{th}$ eigenmode, $A_j$ and $B_j$ are constants to be determined using the boundary conditions along z, and $\delta_j$ is the propagation constant associated with the $j^{th}$ eigenmode. $A_j e^{-\beta_j z} e_j(x, y)$ and $B_j e^{-\beta_j z} e_j(x, y)$ represent the forward and backward propagating parts of the field along z, respectively. To deal with the problem of the continuously changing cross-section of the half-cylinder 914, curved surface 916 is divided into 20 slices of identical thickness. Maxwell's equations provide continuity conditions for the fields, e.g., the tangential electric fields must be equal on each side of each interface. By further bringing in the orthogonality of the eigenmodes, the field output from the asymmetrical element can be deduced analytically by utilizing the scattering matrix (S-matrix) formalism. Generally, eigenmode expansion (EME) provides not only a simulation result, but also deep insight into what is going on inside the device thanks to its eigenmode approach. This insight may advantageously enable the engineering of device structures and moreover, an assortment of illumination conditions can be quickly simulated with minimal additional computation. EME also offers speed advantages when modeling long photonic structures.

Eigenmode solutions may be obtained, for example, through use of an eigenmode solver based on full-vectorial finite difference method (FDM) described by Fallahkhair et al., "*Vector finite difference modesolver for anisotropic dielectric waveguides,*" J. Lightwave Technol., vol. 26, pp. 1423-31, (2008), which is incorporated herein by reference. Eigenmodes may thus be obtained for each slice of the structure under study. The number of mesh lattice units for the computationally transverse region (900 nm wide by 900 nm tall) is set as 110×110 as a tradeoff between computation accuracy and speed. The simulation domain is surrounded by a perfectly matched layer (PML), with the mesh grid size set to be the same as that of the computational region to approximate an open domain. A limit of 50 eigenmodes for each slice was imposed for practical numerical computations. A convergence study has been performed by varying the number of modes and it was found that 50 eigenmodes provide excellent accuracy for the case where the excitation source is a linear combination of eigenmodes of the device.

In the foregoing, an electromagnetic field is represented as a linear combination of eigenmodes of one of the succession of transmissive asymmetric microstructure elements and the succession of transmissive asymmetric microstructure elements is represented as a plurality of mesh lattice units. Eigenmode solutions are then obtained to Maxwell's equations for each mesh lattice unit of the succession of transmissive asymmetric microstructure elements subject to consistent boundary conditions. S-matrix formalism is used to calculate a field output of the succession of transmissive asymmetric microstructure elements for each eigenmode allowing a set of complex-valued coefficient weights to be selected to form a linear superposition of the eigenmodes as the input to the succession of transmissive asymmetric microstructure elements to achieve a specified set of field output characteristics.

Figures 10A, 10B:
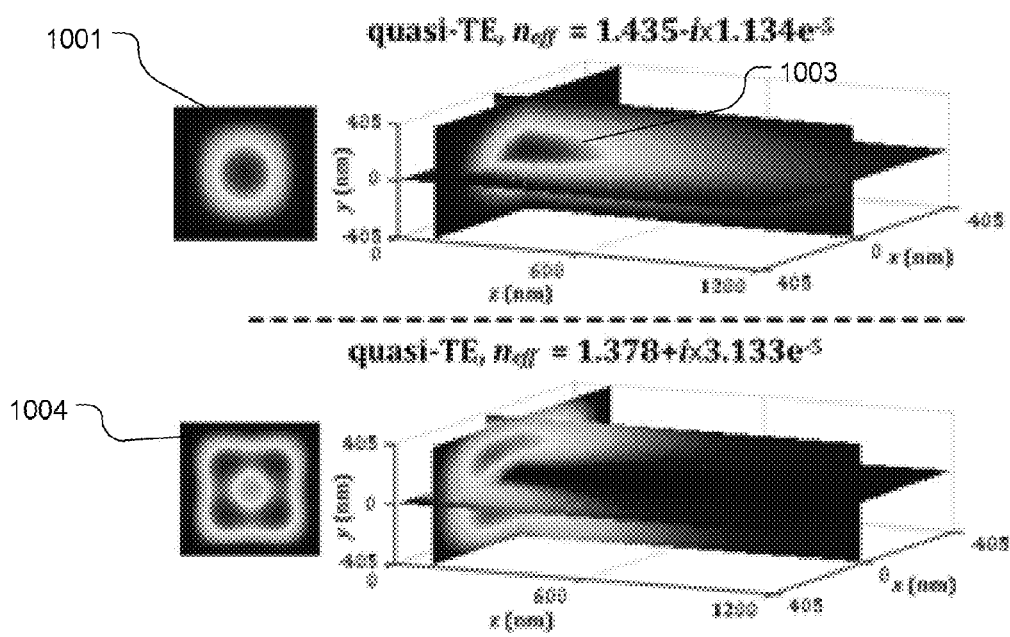
FIGS. 10A and 10B show normalized eigenmode excitation profiles (intensity of the electric component) on the left, and resulting shadow-side field distributions (on the right) for the half-cylinder asymmetrical microstructure shown in FIG. 9A, for the first (FIG. 10A) and fourth (FIG. 10B) quasi-TE eigenmodes. Here, $n_{eff}$ is given by $\beta \times \lambda/(2\pi)$, where $\lambda$ is the free-space wavelength, i.e., 405 nm.

While nonlinear effects were not considered in the example discussed herein, their consideration falls within the scope of the present invention. Thus, analysis can be focused on the output fields of the waveguide supporting stage eigenmodes because the output for an arbitrary input is simply the linear combination of these output fields. FIGS. 10A-10B present the intensity distribution on the shadow side of the asymmetrical microstructure shown in FIG. 9A for two eigenmodes corresponding to the first and fourth largest propagation constants among the 50 eigenmodes. As shown in FIGS. 10A and 10B, the $1^{st}$ eigenmode 1001 can excite a PNJ 1003 on the shadow side of the asymmetrical microstructure, while the $4^{th}$ eigenmode 1004 cannot. For the $2^{nd}$ eigenmode, which is a quasi-TM mode, a PNJ can also be generated. The energy confinement along the z direction for the $2^{nd}$ eigenmode (not shown) is slightly better than that associated with the $1^{st}$ eigenmode. Starting from the $3^{rd}$ eigenmode, a stable PNJ cannot be excited because of the source illumination has multiple antinodes. See FIG. 10B for example. Here, $n_{eff}$ is given by $\beta \times \lambda/(2\pi)$, where $\lambda$ is the free-space wavelength, i.e., 405 nm.

In accordance with a further embodiment of the present invention, the half-cylinder 914 is replaced by a hemisphere 920 with an identical radius for the asymmetrical microstructure (see FIG. 9B) and the EME process is redone to obtain the output responses of the first two eigenmodes of the waveguide supporting stage. First, the intensity on the cross-sections containing the hot spots is computed and then the intensity on the lines x=0 and y=0 is extracted. Computing the full width at half maximum (FWHM) for the intensity on the lines x=0 and y=0 allows an approximate assessment of the field confinement ability of a specified geometry.

FIG. 11A presents the intensities on the lines x=0 and y=0 on the cross-section containing the hot spot for the $1^{st}$ eigenmode of the waveguide supporting stage. Apparently, the hemisphere produces a higher intensity hot spot than the half-cylinder, which indicates a better energy confinement ability. For the hemisphere, the maximum of the curve corresponding to the line x=0 is slightly stronger than that corresponding to y=0 for the 1st eigenmode, but the situation reverses when the $2^{nd}$ eigenmode is the input.

The foregoing phenomenon arises from the polarization state of the input mode: the TE polarization fraction ($E_x$) of the $1^{st}$ eigenmode surpasses 99%, while the TE polarization fraction of the $2^{nd}$ eigenmode is less than 1%. Moreover, the intensity curve for the line x=0 is sharper than that for the line y=0, as shown in FIG. 11A. The situation reverses when the $2^{nd}$ eigenmode of the waveguide supporting stage is the input source. Apparently, none of the FWHM in FIG. 11A or 11B goes below the Abbe diffraction limit (DL) of $\lambda/2$ in free space.

Ultra-Narrow Beam Waist

Note that from the EME process, the S-matrix of the entire asymmetrical microstructure may be computed and the corresponding transmission matrix (T-matrix) is easily obtained. The output field may then simply be represented as the product of the T-matrix associated with the microstructure and the input mode. Because an arbitrary input mode can be represented as the linear combination of the normalized eigenmodes $e_j(x, y)$ of the waveguide supporting stage and the T-matrix can be obtained in one EME computation, the minimization of a PNJ FWHM may be reduced to finding the optimal coefficient combinations $C=[C_1, C_2, \ldots, C_N]$ for the eigenmodes. Here, N is chosen to be 20, i.e., the first 20 eigenmodes of the waveguide supporting stage are used as the basis functions for constructing the input mode.

In the following optimization, the hemisphere-based microstructure is considered, without limitation, because of its ideal performance in confining optical radiation in both x and y directions. Here it should be pointed out that any customization of the output field on the shadow side of the microstructure can be regarded as an optimization problem for C. Hereby, optimization of C may be formulated as $$S = \left\{ C \middle| \rho_{g \in \Xi}(C, g) < \delta, \delta \in R^+, C \in \Theta \right\}, \tag{8}$$

where $\Theta$ is the domain of the coefficient combination C, and $\rho$ is a user-defined objective function to characterize how close the beam shape formed by the current C is to the desired beam shape for a given geometry g of the asymmetrical microstructure. $\delta$ is an arithmetic number, which is pre-selected for the objective function $\rho$ to decide on how many candidates of C are classified as desirable ones to be included in the set S.

The set S that includes the elements resulting in a sub-diffraction beam waist along the x direction of the xz cross-section is to be found. Hence, the objective function is set with $\rho$ and $\delta$ as FWHM|x and $\lambda/2$, respectively. FIG. 12A presents an intensity distribution of the E field on the xz plane for the $1^{st}$ eigenmode of the waveguide supporting stage (i.e., $C_1=1$, and the other coefficients are zero). Apparently, the associated FWHM ($0.889\lambda$) is far larger than the DL in free space. Now, consider setting $C_1=C_8=C_9=C_{11}=C_{12}=1$, $C_7=-1$, and the other coefficients as zero. Using the same T-matrix and simply updating the input vector, a FWHM waist down to $0.338\lambda$ may be obtained, as shown in FIG. 12B. By setting $C_1=1$ and $C_9=1$ or $C_1=1$ and $C_9=3.37$, two other sub-diffraction beam waists are generated, as depicted in FIGS. 12C and 12D. It may be noted that the ultra-narrow beam waist is inevitably accompanied by a sacrifice in the main lobe's amplitude. This trend is similar to the results for the superoscillation lens discussed by Wong et al., "*Superoscillations without sidebands: power-efficient sub-diffraction imaging with propagating waves,*" *Sci. Rep.*, vol. 5, art. 8449, February 2015, which is incorporated herein by reference. The results shown in FIGS. 12A-12D illustrate that an ultra-narrow PNJ may be customized in cases where the input illumination profile can be reliably controlled.

Beam Steering

Figures 13A, 13B, 13C, 13D, 13E:
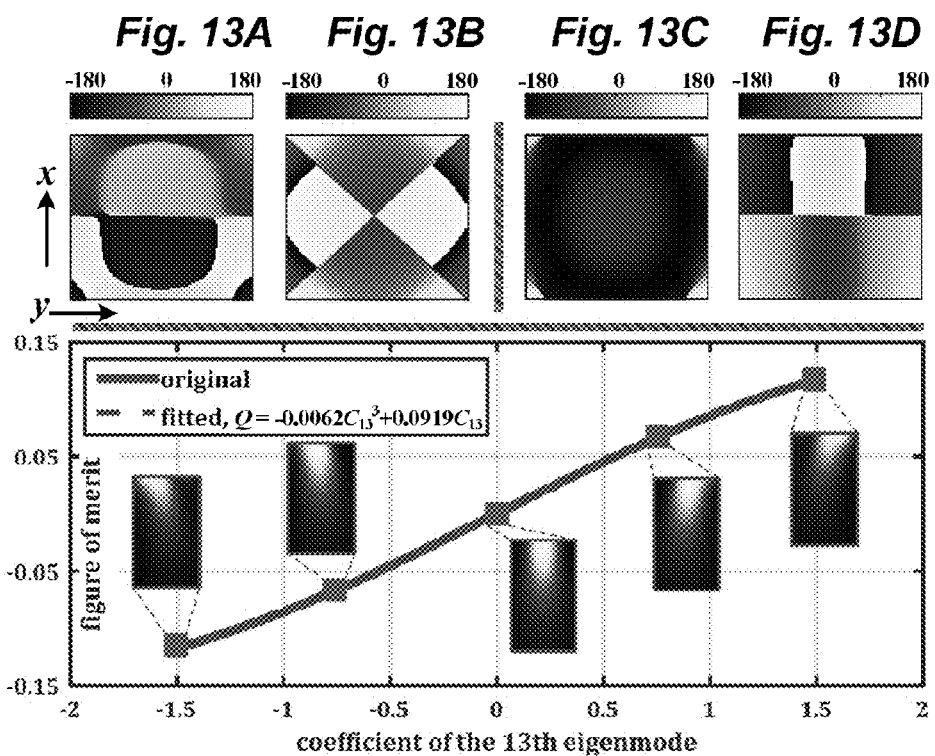

A detailed description is now provided, enabling a reader to continuously steer the output PNJ. The $1^{st}$ and $13^{th}$ eigenmodes may be selected as the basis functions for consideration. The $E_x$ and $E_y$ components of the output field for the xy plane (z=0) are also selected for computing the phase distribution maps accordingly. Here, the $E_z$ component may be ignored because its amplitude is much smaller than $\sqrt{E_x^2+E_y^2}$ for both eigenmodes. As can be seen in FIG. 13A, the phase of the output $E_x$ component corresponding to the $1^{st}$ eigenmode has odd symmetry along the line x=0 and even symmetry along y=0, whereas the phase of the $E_x$ component for the $13^{th}$ eigenmode has even symmetry along both x=0 and y=0. For the $E_y$ component, the situation reverses between the $1^{st}$ and $13^{th}$ eigenmode, but still, the mixed odd/even symmetry is along the x direction, with reference to FIGS. 13C and 13D for comparison. The above discussion makes it possible to control the tilting angle of the output beam on the xz plane while at the same time maintaining the axial symmetry property of the beam on the yz plane. Fixing $C_1=1$ and linearly varying $C_{13}$ in the range of $-1.5$ to $1.5$, the tilting of the beam on the xz plane may be characterized by defining a figure of merit (FOM) Q whose mathematical expression is given by $$Q = \int |E(x,z)|^2 \cos\theta \, dx \, dx, \tag{9}$$

where $\cos\theta$ is given by $$\frac{x}{\sqrt{x^2+y^2}}.$$

As shown in FIG. 13E, Q is an odd and increasing function of $C_{13}$. The insets of FIG. 13E show that the output beam's tilting angle continuously increases with $C_{13}$.

In contradistinction to the combination of the $1^{st}$ and $13^{th}$ eigenmodes, a linear combination of the $2^{nd}$ and $19^{th}$ eigenmodes can result in a continuous rotation of the output beam on the yz plane while maintaining symmetry along the line x=0 on the xz plane. Therefore, the output beam may be advantageously steered in the entire shadow side volume by linearly combining the $1^{st}$, $2^{nd}$, $13^{th}$, and $19^{th}$ eigenmodes using appropriate weighting coefficients.

Control of the Position of the Hot Spot

In the present discussion, only the $1^{st}$ and $10^{th}$ eigenmodes are used. The amplitudes of the $E_y$ components of the output beams corresponding to the 1st and 10th eigenmodes are shown in FIGS. 14A and 14B, respectively. The $E_y$ component is far larger than the other two components. Thus, analyzing the $E_y$ component instead of the entire E field can still help in forecasting the output beam properties. The phase of the $E_y$ components of the output beam associated with the $1^{st}$ and $10^{th}$ eigenmodes are also presented in FIGS. 14C and 14D. Apparently, as circled by the red dotted box, the phase in the top region of FIG. 14C is opposite in sign to that of FIG. 14D, while the phase in the remaining regions of FIGS. 14C and 14D are almost identical. Note that the hot spot in FIG. 14B is located on the line z=0, while the hot spot in FIG. 14A is not. This indicates that the amplitude at the very top of FIG. 14A may be reduced by simply adding to it the output field associated with the $10^{th}$ eigenmode. Moreover, it is to be expected that by varying the coefficient $C_{10}$, the position of the hot spot can be dynamically tuned because of the destructive interference with different strengths in the top region.

To validate the foregoing insight, $C_1=1$ is fixed and $C_{10}$ is varied from $-1$ to $1$, with the corresponding z-coordinate and intensity of the hot spots resulting from the combination of the $1^{st}$ and $10^{th}$ eigenmodes displayed in FIG. 14E. It may be observed that the hot spot is located on the line z=0 for $C_{10}$ between −1 and −0.4 because the fields add constructively near z=0 and the contribution from the $10^{th}$ eigenmode is strong enough to keep the hot spot at z=0. For $C_{10}$ between −0.4 and 0, the fields still add constructively near z=0, but the field due to the $1^{st}$ eigenmode dominates. Thus, the hot spot location moves from z=0 to the location of the hot spot of the $1^{st}$ eigenmode. For positive $C_{10}$, the fields interfere destructively near z=0 and the z-coordinate of the hot spot continues to increase as $C_{10}$ increases. Here it may be noted that the curve for the z-coordinate of the hot spots in FIG. 6E is obtained with sub-pixel precision by fitting three consecutive points around the maximal intensity to a parabola. Although the z-coordinate of the hot spot can be pushed as far as 303 nm, this is accompanied by the continuous reduction of hot spot intensity, as depicted in FIG. 14E. Thus, requiring a specific output beam characteristic often requires sacrificing some other properties and these should be carefully weighed in practical applications in accordance with the teachings provided herein.

Related teachings may be found in:

Zhu et al., "Spatial control of photonic nanojets," Opt. Express, vol. 24, pp. 30444-54 (December, 2016); and Zhu et al., "Controlling Photonic Nanojets: From the Standpoint of Eigenmodes," IEEE Photonics Tech. Lett., vol. 30, pp. 75-78 (January, 2017), both of which papers are incorporated herein by reference.

The embodiments of the invention described above are intended to be merely exemplary; numerous variations and modifications will be apparent to those skilled in the art. All such variations and modifications are intended to be within the scope of the present invention as defined in any appended claims.

We claim:

1. A method for concentrating incident visible light, the method comprising:
   providing a plurality of successive transmissive asymmetric microstructure elements, each of the plurality of successive transmissive asymmetric microstructure elements having a physical shape that lacks symmetry other than about a central propagation vector of the incident visible light within the each of the plurality of successive transmissive asymmetric microstructure elements; and
   coupling the incident visible light through the plurality of successive transmissive asymmetric microstructure elements,
   wherein the incident visible light has a central wavelength; and
   wherein the plurality of successive transmissive asymmetric microstructure elements concentrates the incident visible light into a focal volume.

2. A method in accordance with claim 1, wherein the focal volume is characterized by a waist having an intensity FWHM smaller than half the central wavelength of the incident light.

3. A method in accordance with claim 1, wherein each of the plurality of successive transmissive asymmetric microstructure elements is located within an ambient medium and wherein the each of the plurality of successive transmissive asymmetric microstructure elements has an index of refraction exceeding that of the ambient medium.

4. A method in accordance with claim 1, wherein one of the plurality of successive transmissive asymmetric microstructure elements includes a hemispherical cap.

5. A method in accordance with claim 1, wherein one of the plurality of successive transmissive asymmetric microstructure elements includes a cylindrical cap.

6. A method in accordance with claim 1, wherein propagation of the incident visible light within the plurality of successive transmissive asymmetric microstructure elements forms a plurality of successive energy convergence regions and wherein each of the plurality of successive energy convergence regions is formed by constructive interference of the incident visible light.

7. A method in accordance with claim 1, wherein the successive transmissive asymmetric microstructure elements are designed in accordance with steps of:
   a. representing an electromagnetic field as a linear combination of eigenmodes of one of the successive transmissive asymmetric microstructure elements;
   b. representing the successive transmissive asymmetric microstructure elements as a plurality of mesh lattice units;
   c. obtaining eigenmode solutions to Maxwell's equations for each mesh lattice unit of the successive transmissive asymmetric microstructure elements subject to consistent boundary conditions;
   d. employing S-matrix formalism to calculate a field output of the succession of transmissive asymmetric microstructure elements for each eigenmode; and
   e. selecting a set of complex-valued coefficient weights to form a linear superposition of the eigenmodes as the input to the successive transmissive asymmetric microstructure elements to achieve a specified set of field output characteristics.

8. A method for collecting visible light, the method comprising:
   providing a plurality of successive transmissive asymmetric microstructure elements, each of the plurality of successive transmissive asymmetric microstructure elements having a physical shape that lacks symmetry other than about a central propagation vector of the visible light within the each of the plurality of successive transmissive asymmetric microstructure elements;
   providing a volume from which visible light is to be collected; and
   coupling the visible light from the volume through the plurality of successive transmissive asymmetric microstructure elements,
   wherein the plurality of successive transmissive microstructure elements collects the visible light from the volume.

9. A method in accordance with claim 8, wherein each of the plurality of successive transmissive asymmetric microstructure elements is located within an ambient medium and wherein the each of the plurality of successive transmissive asymmetric microstructure elements has an index of refraction exceeding that of the ambient medium.

10. A method in accordance with claim 8, wherein one of the plurality of successive elements includes a hemispherical cap.

11. A method in accordance with claim 8, wherein one of the plurality of successive elements includes a cylindrical cap.

12. A device for at least one of forming a photonic nanojet and collecting visible light from a volume, the device comprising:
   a plurality of successive transmissive asymmetric microstructure elements configured to receive and transmit an electromagnetic wave, wherein each of the plurality of successive transmissive asymmetric microstructure elements has a physical shape that lacks symmetry other than about a central propagation vector of the electromagnetic wave within the each of the plurality of successive transmissive asymmetric microstructure elements; and wherein a central wavelength of the electromagnetic wave corresponds to a wavelength of visible light.

13. A device in accordance with claim 12, wherein each of the plurality of successive transmissive asymmetric microstructure elements is located within an ambient medium and wherein the each of the plurality of successive transmissive asymmetric microstructure elements has an index of refraction exceeding that of the ambient medium.

14. A device in accordance with claim 12, wherein one of the plurality of successive transmissive elements includes a hemispherical cap.

15. A device in accordance with claim 12, wherein one of the plurality of successive transmissive elements includes a cylindrical cap.

* * * * *